United States Patent
Tetsuno et al.

(10) Patent No.: US 7,051,693 B2
(45) Date of Patent: May 30, 2006

(54) ENGINE STARTING SYSTEM

(75) Inventors: Masayuki Tetsuno, Fuchu-cho (JP); Junichi Taga, Fuchu-cho (JP); Takanori Sugiyama, Fuchu-cho (JP); Hideki Hosoya, Fuchu-cho (JP); Yoshiteru Nakayama, Fuchu-cho (JP); Keiji Araki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/992,660

(22) Filed: Nov. 22, 2004

(65) Prior Publication Data

US 2005/0109302 A1 May 26, 2005

(51) Int. Cl.
*F02N 17/00* (2006.01)
(52) U.S. Cl. .................................. 123/179.5
(58) Field of Classification Search ............ None See application file for complete search history.

(56) References Cited

U.S. PATENT DOCUMENTS 6,823,827 B1 * 11/2004 Sugiura et al. .......... 123/179.4
2003/0101956 A1 * 6/2003 Sieber ...................... 123/179.5

* cited by examiner

*Primary Examiner*—Andrew M. Dolinar
(74) *Attorney, Agent, or Firm*—Donald R. Studebaker; Nixon Peabody LLP

(57) ABSTRACT

When an engine restart request is given in an engine stopping period which begins at a point of fuel supply interruption and ends at a point of complete engine stop, an engine starting system judges whether TDC engine speed detected immediately before is equal to or lower than a specific value "A", the counted number of reverse running motions of the engine is 0, and a piston in an expansion stroke cylinder is relatively close to TDC. If the judgment result is in the affirmative with all these conditions satisfied, the engine starting system injects fuel into the expansion stroke cylinder and then ignites and combusts a mixture produced therein. The engine starting system also injects the fuel into a compression stroke cylinder and then ignites and combusts a mixture produced therein when a piston in the compression stroke cylinder has gone beyond TDC.

9 Claims, 20 Drawing Sheets

FIG.6
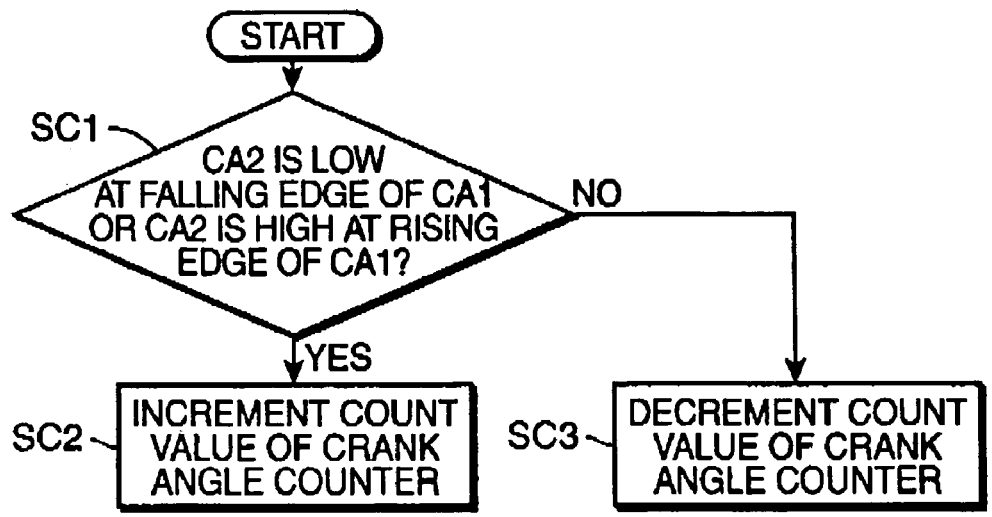
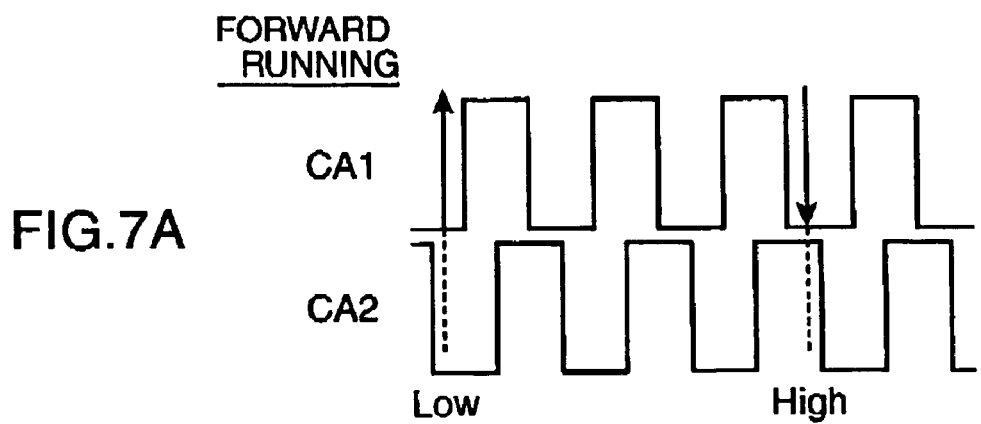
FIG.7A
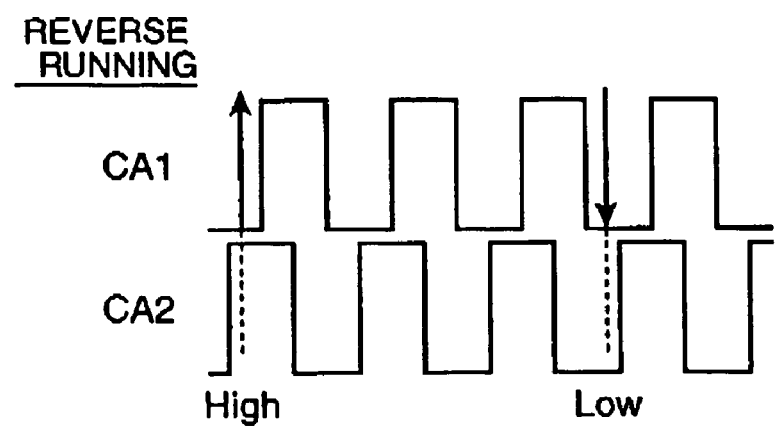
FIG.7B

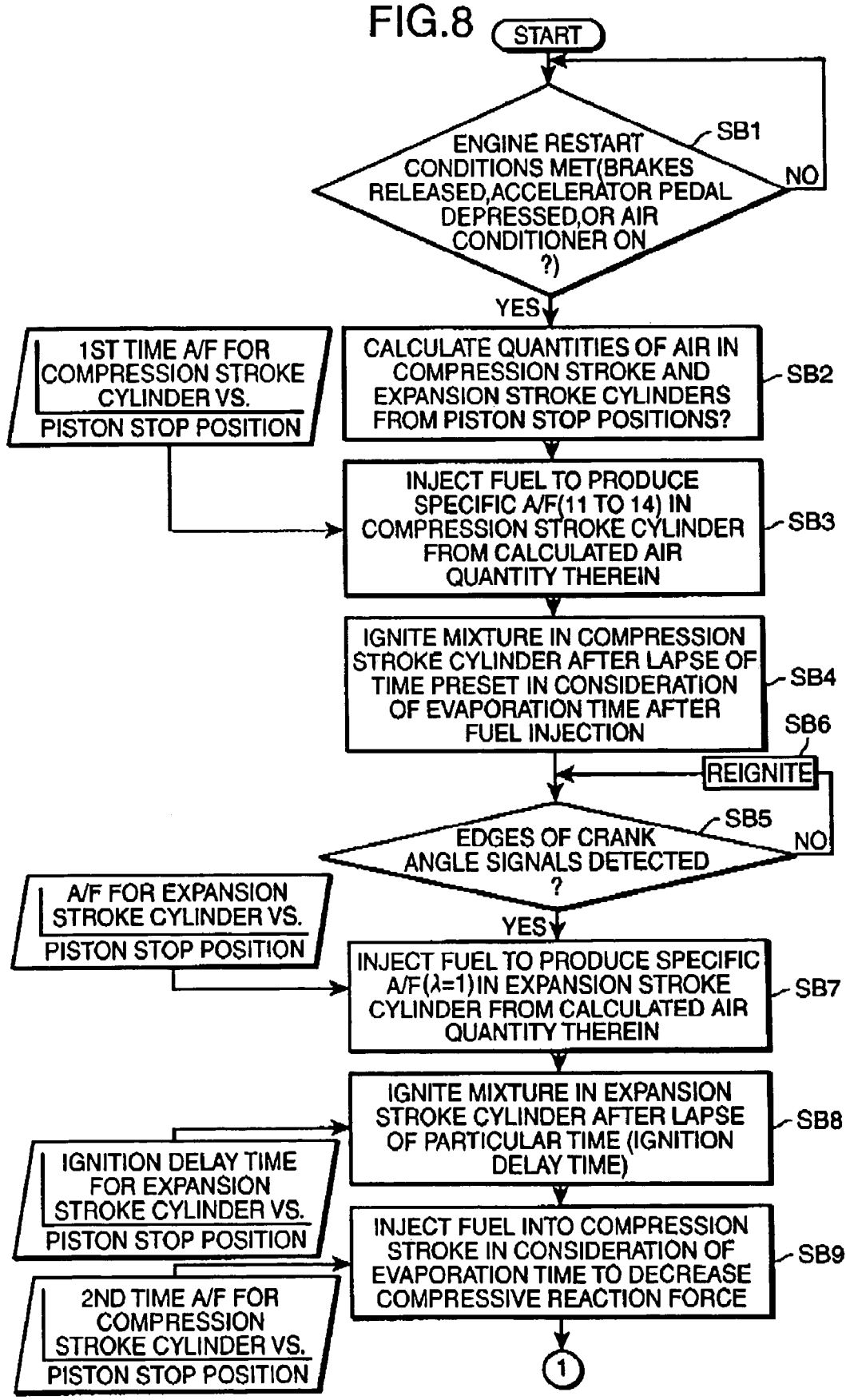

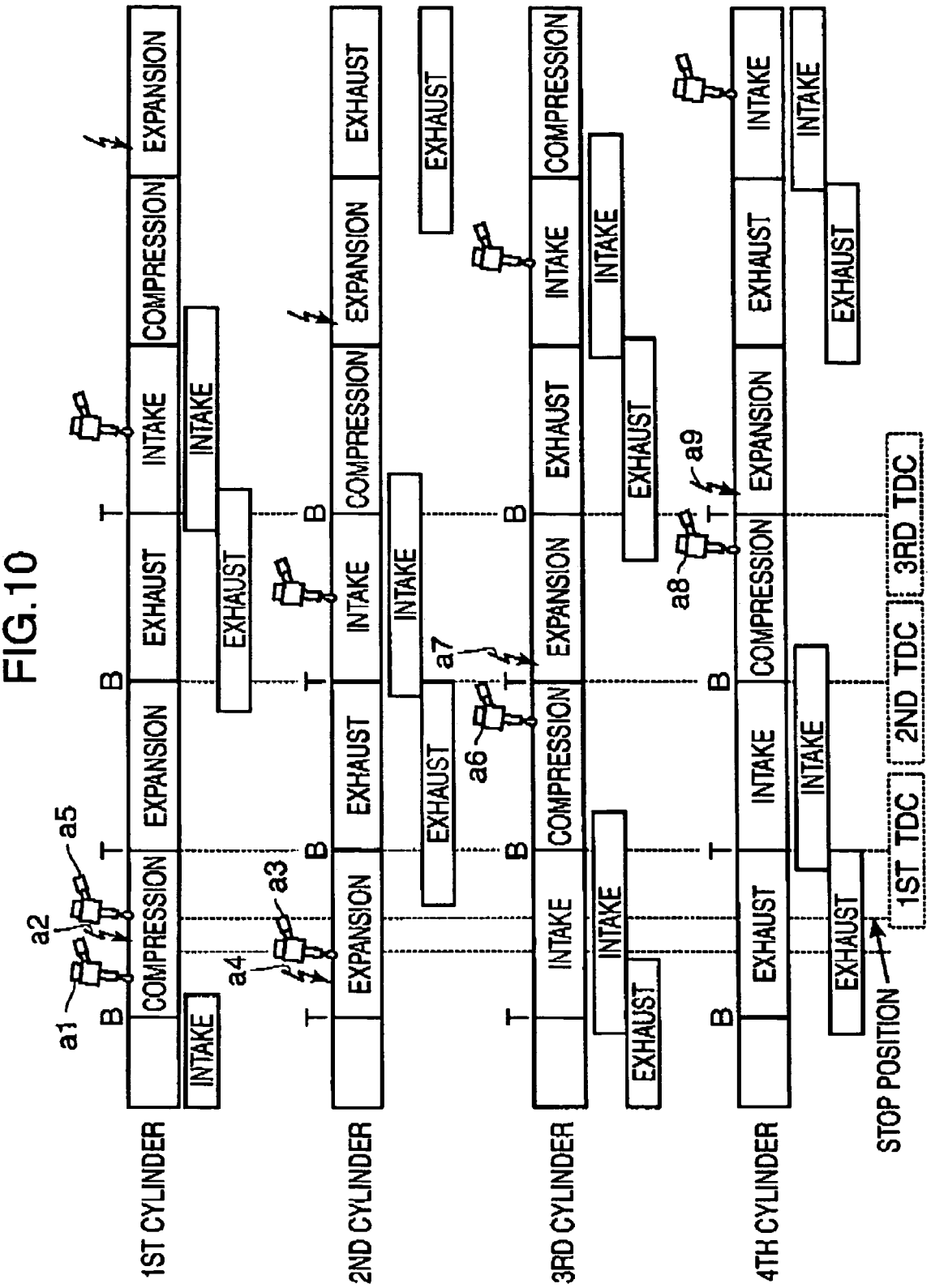

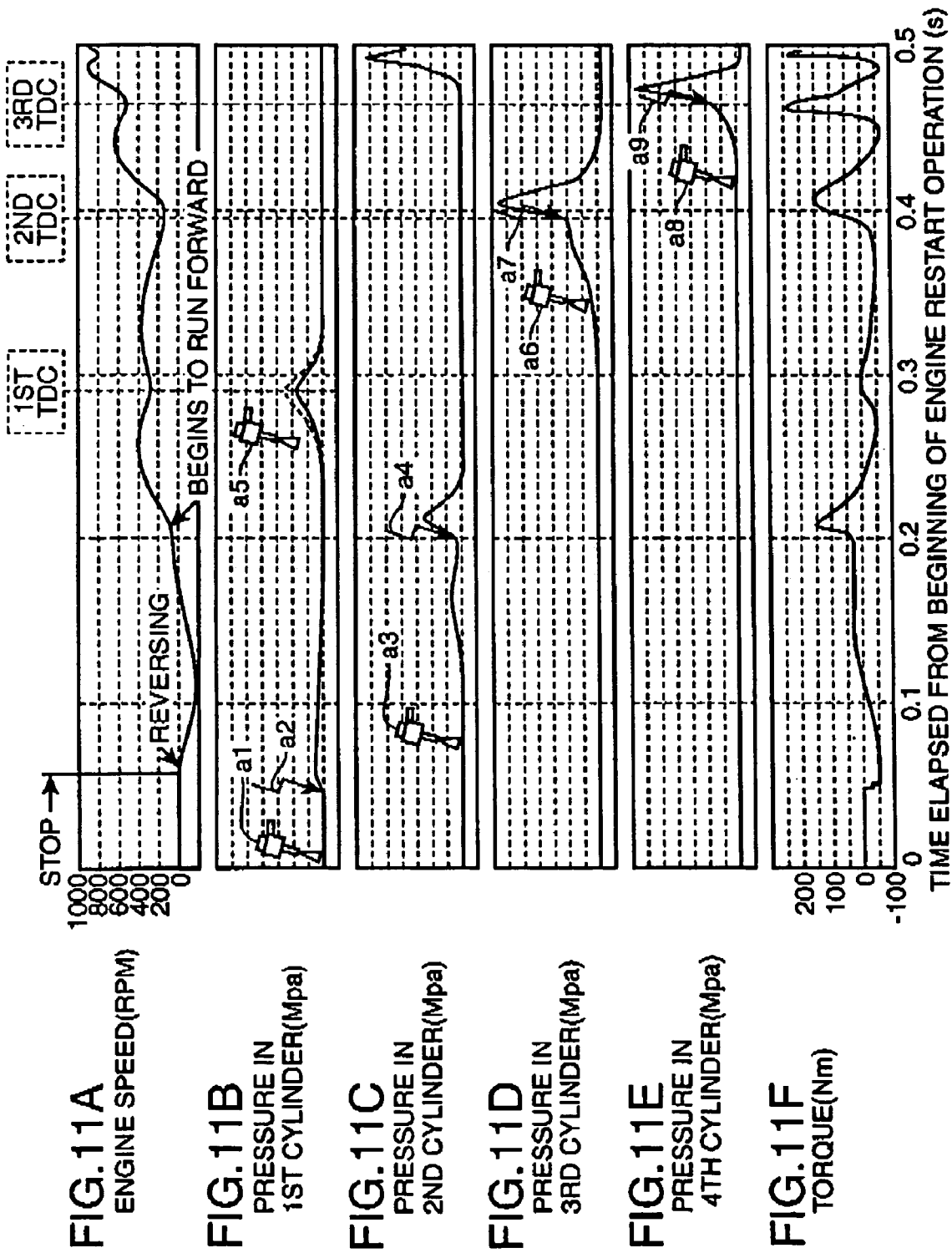

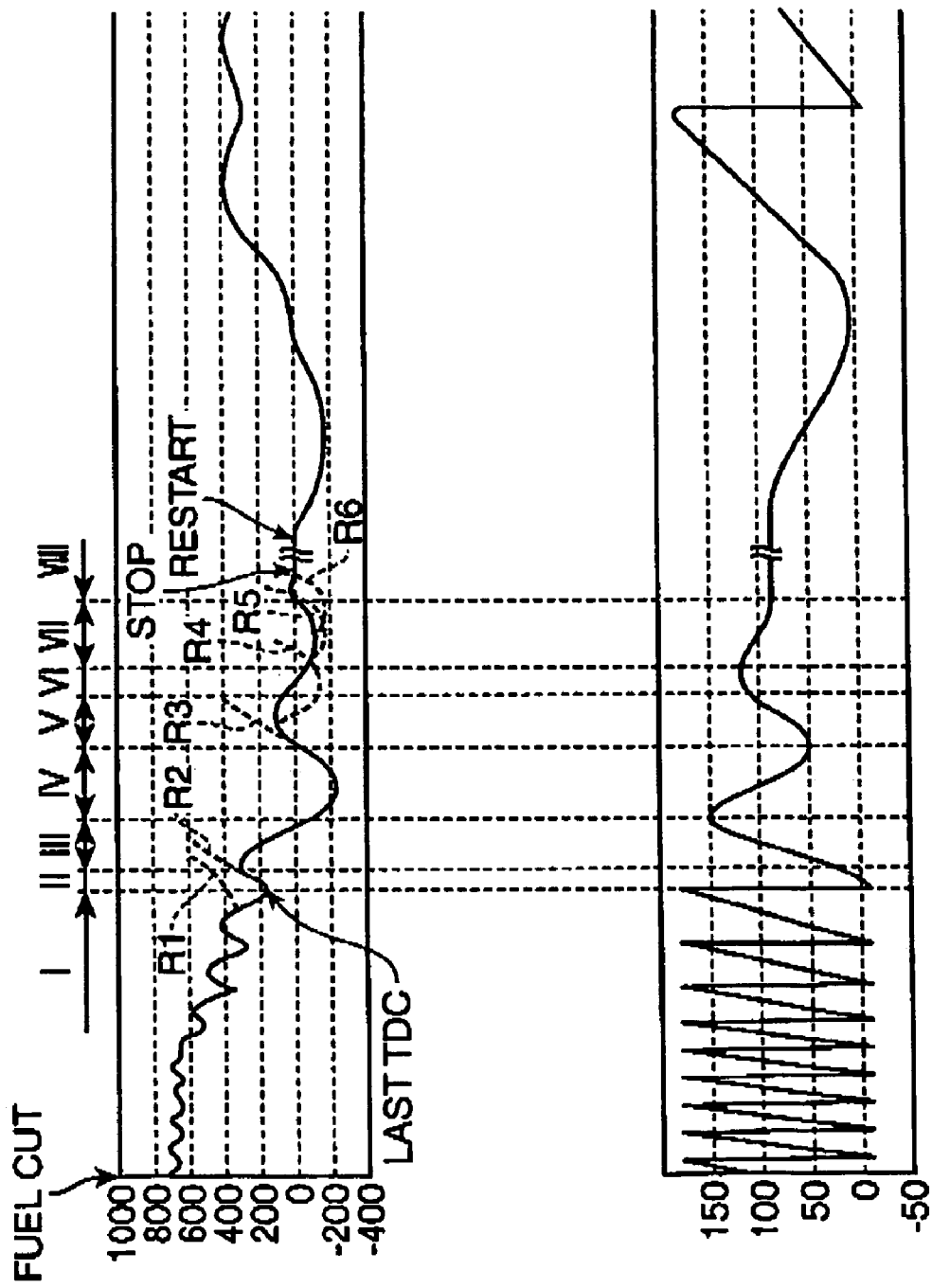

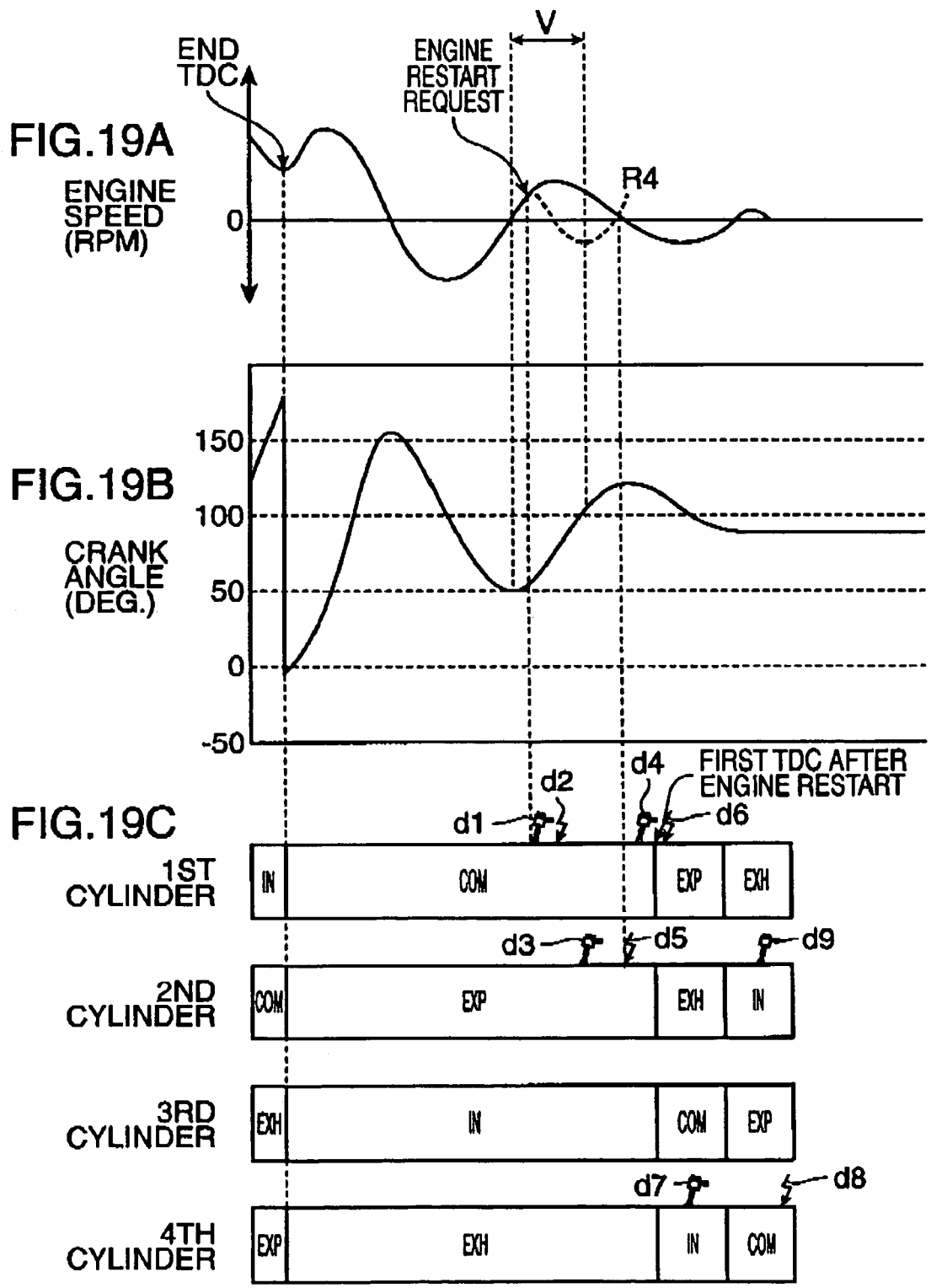

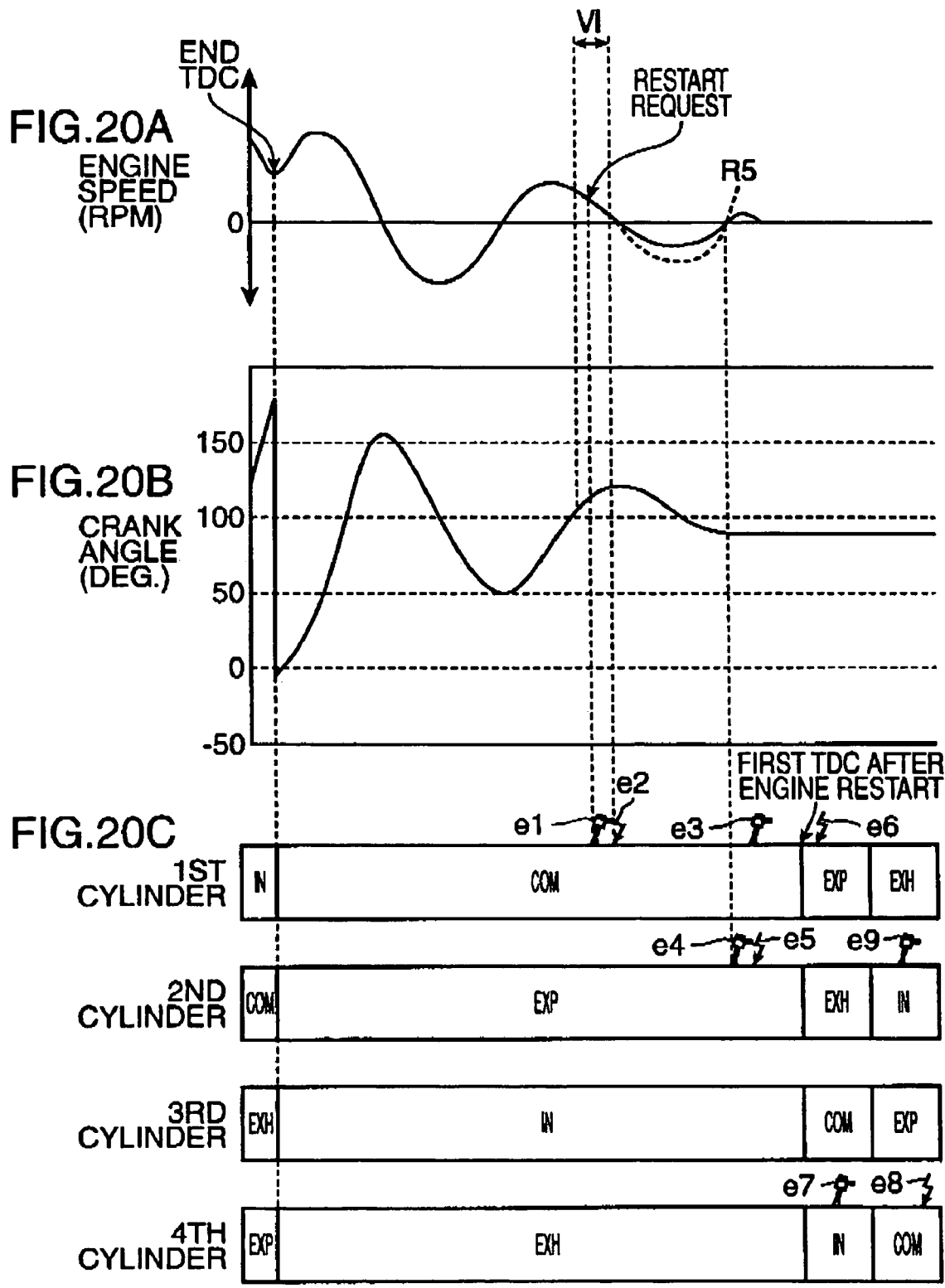

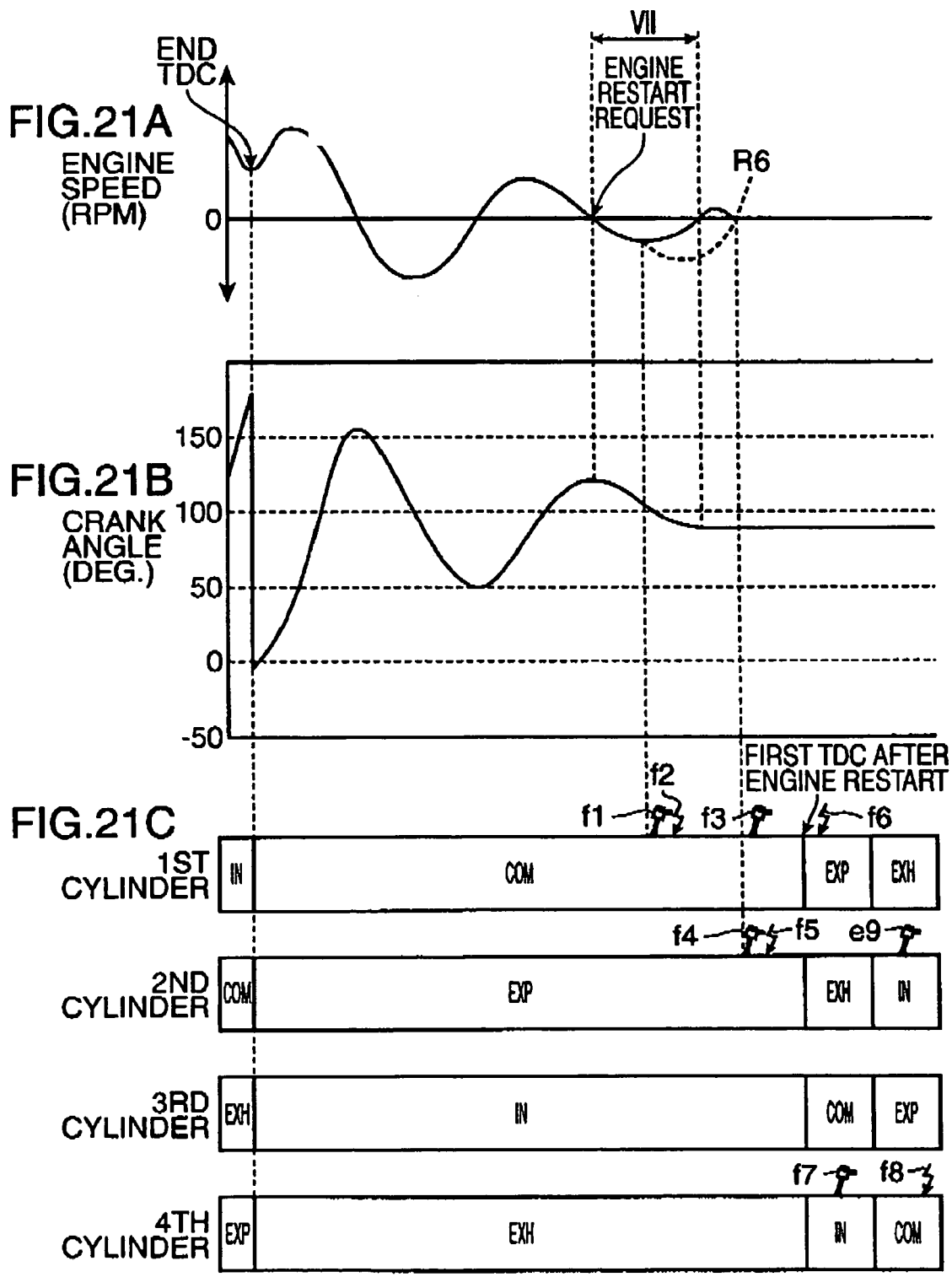

ENGINE STARTING SYSTEM

BACKGROUND OF THE INVENTION

1. Field of the Invention

The present invention relates generally to an engine starting system for restarting an engine which has once stopped automatically under engine idle conditions in response to an engine restart request, and in particular to a start control technique used for restarting an engine when an engine restart request is given in an engine stopping period which begins at a point of fuel supply interruption and ends at a point of complete engine stop.

2. Description of the Related Art

There exist conventionally known engine control systems devised for reducing fuel consumption and carbon dioxide ($CO_2$) emissions, for instance. One example of such engine control systems is an idle stop system which causes an engine to automatically stop during engine idle operation and automatically restart when an engine restart request, such as a driver's operation for starting, occurs.

A generally known method of restarting a once stopped engine is to start the engine by cranking an engine output shaft by means of an external driving device, such as a starter motor. Using this conventional approach employing a starter motor in an idle stop system is impractical, however. Since the idle stop system stops and restarts the engine each time the engine is brought to idle, the starter motor must restart the engine a significantly larger number of times compared to a case where the engine is not stopped at idle. Therefore, the starter motor, if employed in an idle stop system, must have considerably high durability, which results in an unwanted cost increase.

Under these circumstances, techniques for restarting the engine without using the starter motor have been developed in recent years. According to an engine restarting method disclosed in Japanese Laid open Utility Model Publication No. 1985-128975 and Japanese Laid-open Patent Publication No. 2003-517134, for example, fuel is injected into a cylinder which is on an expansion stroke under engine stop conditions and a mixture thus produced in the cylinder is ignited and burnt to provide a starting torque for restarting the engine. In this kind of technique for restarting the engine without using the starter motor or the like, the starting torque produced at engine restart varies depending on where a piston in the cylinder on the expansion stroke stops at engine stop. Therefore, the conventional idle stop system controls the engine such that the piston in the cylinder on the expansion stroke stops at a position within a specified range of crank angle suitable for restarting the engine at engine stop by using a braking device or by regulating valve opening as shown in the aforementioned Publications.

On the other hand, Japanese Laid-open Patent Publication No. 2003-515052 discloses another engine starting technique which makes it possible to obtain a greater starting torque than obtained by the techniques of the aforementioned prior art Publications. According to this alternative engine starting technique, fuel is injected into a cylinder which is on an expansion stroke under engine stop conditions and a mixture thus produced in the cylinder is ignited and burnt to rotate a crankshaft slightly in a reverse direction and thereby compress the mixture in the cylinder on the expansion stroke. The compressed mixture in the cylinder is ignited and burnt again to eventually restart the engine.

Generally, even after fuel supply is interrupted, an engine rotates several times by inertia before it completely stops. It may commonly be understood that, if an engine restart request is given during this engine stopping period, the once stopped engine could be restarted by injecting fuel into a cylinder which is currently on an intake or expansion stroke and igniting a mixture produced in the cylinder in the same way as in an ordinary engine start sequence.

Immediately before complete engine stop when engine speed is extremely low, however, rotational inertial force of the engine is extremely small. Even when ordinary start-up control operation is performed as described above under such conditions, an adequate starting torque may not be obtained, resulting in a failure to restart the engine. To ensure successful engine restart, the engine control systems of the prior art Publications wait for a cylinder to reach a crank angle falling within the aforementioned specified range before restarting the engine when an engine restart request, such as depression of an accelerator pedal, is given.

It is recognized from the foregoing discussion that the conventional engine control systems have a problem that these engine control systems must wait for the engine to completely stop before restarting the engine if an engine restart request is given in the engine stopping period by the driver or else, and this causes some delay in restarting the engine from the point of the engine restart request.

SUMMARY OF THE INVENTION

The present invention has been made to provide a solution to the aforementioned problem of the prior art. Accordingly, it is a general object of the invention to provide an engine starting system for restarting an engine without using a starter motor. It is a more specific object of the invention to provide an engine starting system which can quickly restart an engine in response to an engine restart request even when the request is given in an engine stopping period by using a novel engine restart technique.

When an engine restart request is given immediately before an engine stops, an engine starting system of this invention intended to achieve the aforementioned object injects fuel into a cylinder which is currently on an expansion stroke and then ignites and combusts a mixture produced therein to give a forward-acting torque to the engine in a reliable fashion without waiting for complete engine stop.

In one principal form of the invention, an engine starting system restarts an engine having multiple cylinders by injecting fuel at least into one of the cylinders which is on an expansion stroke at engine stop and then igniting and combusting a mixture produced in the expansion stroke cylinder. This engine starting system includes an engine stopping section for stopping the engine by interrupting fuel supply to the individual cylinders while the engine is running, a pre-stopping engine state sensing section for detecting that the engine is in a state immediately before stopping wherein engine speed is lower than a specific value, a restart conditions checking section for judging whether specific engine restart conditions have been satisfied, and an engine restarting section for injecting the fuel into the cylinder which is on the expansion stroke and then igniting and combusting the mixture produced therein if the engine is in the state immediately before stopping when the restart conditions checking section has judged that the engine restart conditions have been satisfied in an engine stopping period which begins at a point of fuel supply interruption by the engine stopping section and ends at a point of complete engine stop.

If an engine restart request is given in the engine stopping period, during which the engine speed gradually decreases and eventually becomes zero, after the engine stopping section has interrupted the fuel supply to the individual cylinders, and the engine is in a state immediately before stopping with the engine speed being lower than the aforementioned specific value at the moment of the engine restart request, the engine restarting section injects the fuel into the cylinder which is on the expansion stroke and then ignites and combusts the mixture produced therein in the engine starting system of the invention configured as mentioned above, unlike a conventional engine starting system employing an ordinary combustion control method in which the fuel is supplied in each intake or compression stroke and the mixture is ignited before the top dead center (TDC). Since a forward-acting torque is efficiently given to the engine rotation in a forward direction, it is possible to restart the engine in a reliable fashion.

With this arrangement, it is possible to quickly restart the engine even when the engine restart request is given immediately before engine stop.

These and other objects, features and advantages of the invention will become more apparent upon reading the following detailed description along with the accompanying drawings.

BRIEF DESCRIPTION OF THE DRAWINGS

FIG. 4A showing engine speed, FIG. 4B showing crank angle, FIG. 4C showing throttle opening, FIG. 4D showing intake air pipe negative pressure, and FIG. 4E showing successive strokes of individual cylinders;

FIG. 6 is a flowchart of a stop position detecting subroutine performed for detecting the piston stop position in the cylinder which is on an expansion stroke at engine stop:

FIGS. 7A and 7B are diagrams showing how crank angle signals output from a pair of crank angle sensors are related in phase, FIG. 7A showing a phase relation observed when the engine runs in a forward direction, and FIG. 7B showing a phase relation observed when the engine runs in a reverse direction;

FIG. 8 is a flowchart showing a first half of an engine restart control operation routine performed for automatically restarting the engine from idle stop;

FIG. 10 is a diagram showing fuel injection and ignition timings at engine restart for the individual cylinders in relation to the timing of the successive strokes;

FIGS. 11A–11F are time charts showing how conditions of the engine vary during engine restart, FIG. 11A showing variations in engine speed, FIGS. 11B–11E showing variations in pressure in the individual cylinders, and FIG. 11E showing variations in the amount of torque generated by the engine;

FIGS. 16A and 16B are time charts showing how conditions of the engine vary during the engine stopping period. FIG. 16A showing variations in engine speed, and FIG. 16B showing variations in crank angle;

FIGS. 19A–19C are diagrams showing how the engine is restarted in the engine stopping period when the number of reverse running motions of the engine is 1 and the piston in the cylinder on the expansion stroke is within the specific range from TDC in terms of crank angle. FIG. 19A showing the engine speed, FIG. 19B showing the crank angle, and FIG. 19C showing fuel injection and ignition timings for the individual cylinders in relation to the timing of the successive strokes;

FIGS. 20A–20C are diagrams showing how the engine is restarted in the engine stopping period when the number of reverse running motions of the engine is 1 and the piston in the cylinder on the expansion stroke is outside the specific range from TDC in terms of crank angle, FIG. 20A showing the engine speed, FIG. 20B showing the crank angle, and FIG. 20C showing fuel injection and ignition timings for the individual cylinders in relation to the timing of the successive strokes; and FIGS. 21A–21C are diagrams showing how the engine is restarted in the engine stopping period when the number of reverse running motions of the engine is 2, FIG. 21A showing the engine speed, FIG. 21B showing the crank angle, and FIG. 21C showing fuel injection and ignition timings for the individual cylinders in relation to the timing of the successive strokes.

DETAILED DESCRIPTION OF THE PREFERRED EMBODIMENTS OF THE INVENTION

A preferred embodiment of the invention is now described in detail with reference to the accompanying drawings.

General Structure of Engine Control System

Figure 1:
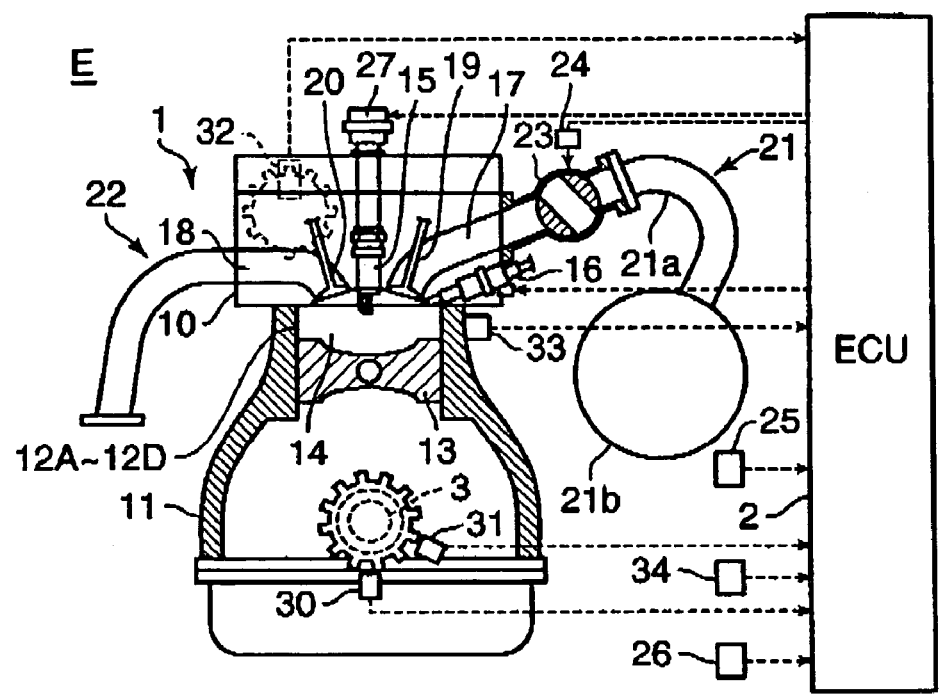
FIG. 1 is a partially sectional diagram generally showing the structure of an engine system including an engine provided with an engine starting system according to an embodiment of the invention.
Figure 2:
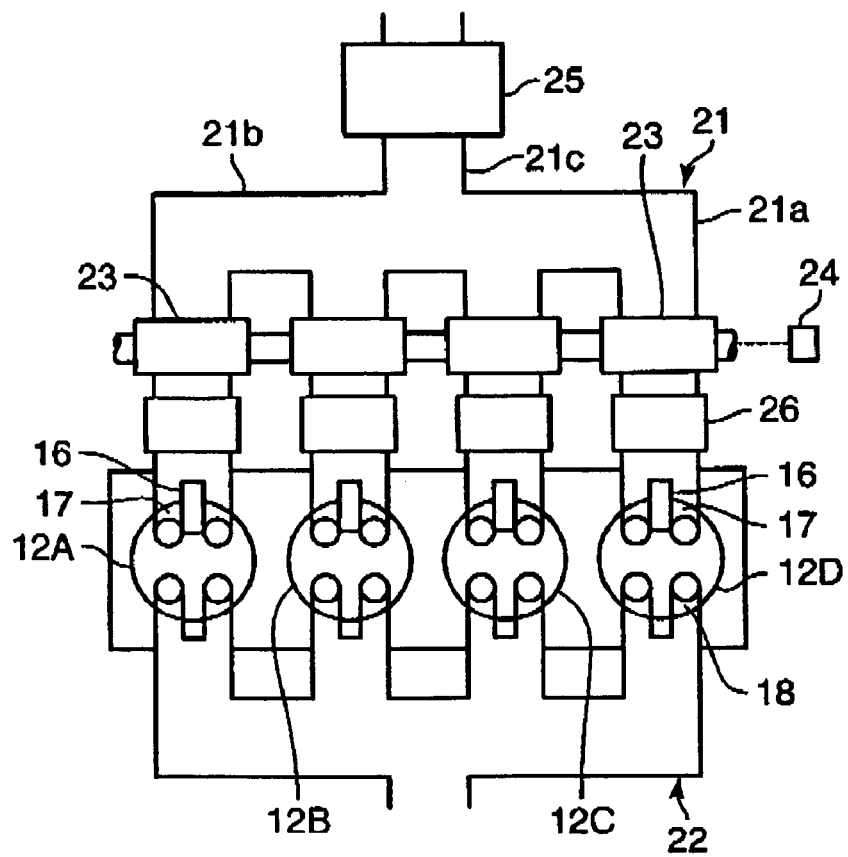
FIG. 2 is a schematic diagram showing the configuration of intake and exhaust systems of the engine of FIG. 1.

FIGS. 1 and 2 are diagrams schematically showing the structure of an engine system E provided with an engine starting system according to the embodiment of the invention. Referring to FIG. 1, the engine system E includes an engine 1 having a cylinder head 10 and a cylinder block 11 and an electronic control unit (ECU) 2. The engine 1 has four cylinders 12A–12D as shown in FIG. 2. Pistons 13 connected to a crankshaft 3 are fitted in the individual cylinders 12A–12D whereby a combustion chamber 14 is formed above the piston 13 in each of the cylinders 12A–12D as shown in FIG. 1.

Figure 4:
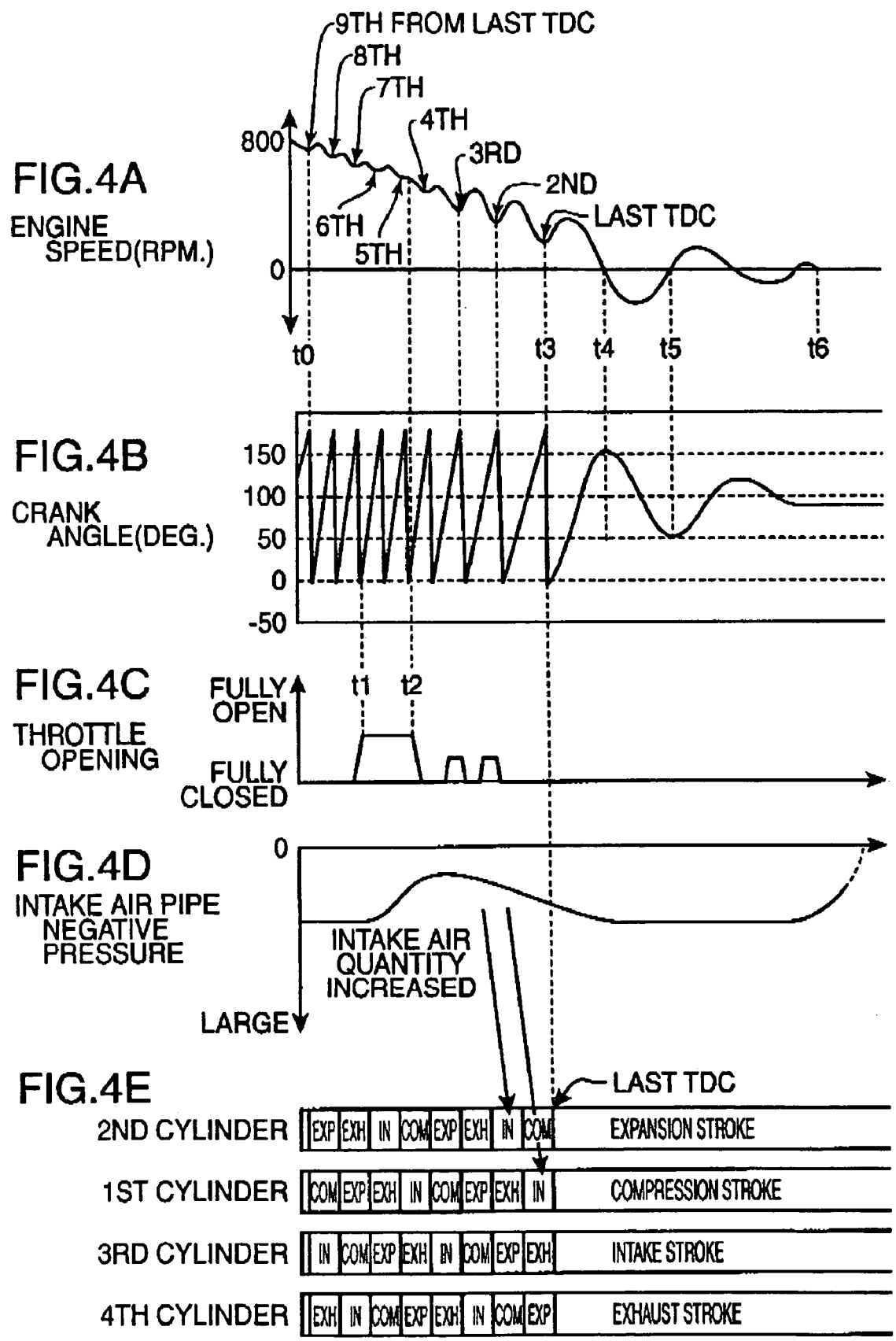
FIGS. 4A–4E are diagrams schematically showing engine stop control operation performed in an engine stopping period.

Generally, a four-cycle multicylinder engine is constructed in such a fashion that individual cylinders undergo successive combustion cycles of intake, compression, expansion and exhaust strokes with a specific phase delay from one cylinder to another. The cylinders 12A–12D of the four-cylinder engine of this embodiment, which are now referred to as the first cylinder 12A, the second cylinder 12B, the third cylinder 12C and the fourth cylinder 12D in this order as viewed from one end of a cylinder bank, undergo the aforementioned combustion cycles with a successive phase delay of 180° in terms of crank angle in the order of the first cylinder 12A, the third cylinder 12C, the fourth cylinder 12D and the second cylinder 12B as shown in FIG. 4E.

Disposed at the top of the combustion chamber 14 in each of the cylinders 12A–12D is a spark plug 15 for igniting and combusting a mixture in the combustion chamber 14 with an electrode of the spark plug 15 at a far end thereof located in the combustion chamber 14. There is installed a fuel injector 16 at one side (right side as illustrated in FIG. 1) of the combustion chamber 14 for injecting fuel directly into the combustion chamber 14. The fuel injector 16 is oriented such that it sprays the fuel toward the vicinity of the electrode of the spark plug 15. Incorporating a needle valve and a solenoid which are not illustrated, the fuel injector 16 is actuated by a pulse signal fed from the ECU 2. When this pulse signal is input, the fuel injector 16 opens for a period of time corresponding to the pulselength of the pulse signal to inject the fuel in a quantity corresponding to valve opening time into the cylinder 12. The fuel is supplied to each fuel injector 16 from a fuel pump (not shown) via a fuel supply channel. A fuel supply system of the engine system E is constructed in such a way that the fuel supply system produces a fuel supply pressure higher than pressure in the combustion chamber 14 during each successive compression stroke.

There are formed intake ports 17 and exhaust ports 18 opening into the combustion chambers 14 of the individual cylinders 12A–12D at upper portions thereof with intake valves 19 and exhaust valves 20 provided in the intake ports 17 and the exhaust ports 18, respectively. The intake valves 19 and the exhaust valves 20 are actuated by valve actuating mechanisms (not shown) including camshafts. As already mentioned, opening and closing timing of the intake and exhaust valves 19, 20 of the individual cylinders 12A–12D is preset such that the cylinders 12A–12D undergo the combustion cycles with the aforementioned successive phase delay.

The intake ports 17 are connected to an intake passage 21 while the exhaust ports 18 are connected to an exhaust passage 22. Close to the intake ports 17, the intake passage 21 are separated into four branched intake channels 21a which are connected to the individual cylinders 12A–12D and throttle valves (intake air quantity regulator) 23 for regulating the cross-sectional internal area of the individual branched intake channels 21a are provided therein as shown in FIG. 2. More specifically, the intake passage 21 includes the branched intake channels 21a connecting to the individual cylinders 12A–12D downstream of a surge tank 21b, downstream ends of the branched intake channels 21a joining to the intake ports 17 of the respective cylinders 12A–12D. The throttle valves 23 disposed near the downstream ends of the branched intake channels 21a are multiple (multi-throttle) rotary valves which are driven by an actuator 24. An airflow sensor (intake air quantity sensor) 25 for detecting the quantity of air is provided in a common intake passage portion 21c of the intake passage 21 upstream of the surge tank 21b. Also, intake air pressure sensors 26 for detecting intake air pressure are provided in the individual branched intake channels 21a of the intake passage 21 downstream of the throttle valves 23.

The engine system E includes a pair of first and second crank angle sensors 30, 31 for detecting the angle of rotation of the crankshaft 3. The ECU 2 determines engine speed based on a signal output from one of these crank angle sensors, or the first crank angle sensor 30 and detects the direction and angle of rotation of the crankshaft 3 from mutually phase-offset crank angle signals (first crank angle signal CA1 and second crank angle signal CA2) output from the two crank angle sensors 30, 31 as will be later discussed in detail. The engine system E further includes cam angle sensors 32 for detecting specific rotational positions of the aforementioned camshafts and outputting detected signals as cylinder identification signals. Other constituent components of the engine system E necessary for controlling the engine 1 include a water temperature sensor 33 for detecting the temperature of engine cooling water and an accelerator depression sensor 34 for detecting the amount of depression of an accelerator pedal.

Upon receiving signals from the individual sensors 25, 26, 30–34 mentioned above, the ECU 2 outputs a signal for controlling the quantity of fuel to be injected and fuel injection timing to each of the fuel injectors 16, a signal for controlling ignition timing to an ignition device 27 for actuating the individual spark plugs 15, and a signal for controlling throttle opening of each of the throttle valves 23 to the actuator 24.

While a detailed description is given below, the ECU 2 automatically stops the engine 1 by cutting fuel supply when specific conditions for engine stop are met during engine idle operation, and the ECU 2 automatically restarts the engine 1 when specific conditions for engine restart, such as depression of the accelerator pedal by a driver, are met subsequently.

According to the present embodiment, the ECU 2 causes the engine 1 to restart by its own motive power without the aid of a starter motor. Specifically, when the engine 1 is stopped at idle, the ECU 2 produces initial combustion in the cylinder 12 of which piston 13 is halfway on the compression stroke to lower the piston 13 and rotate the crankshaft 3 slightly in a reverse running direction. As a consequence, the piston 13 in the cylinder 12 which is initially on the expansion stroke ascends, thereby compressing a mixture in that cylinder 12. Then, the ECU 2 ignites and burns the mixture in the cylinder 12 on the expansion stroke to produce a torque acting on the crankshaft 3 in a forward running direction thereof to restart the engine 1.

To cause the engine 1 to restart by its own motive power alone, it is necessary to generate as great a torque as possible acting on the crankshaft 3 in the forward running direction by producing combustion in the aforementioned cylinder 12 which is initially on the expansion stroke so that the piston 13 in the cylinder 12 which is initially on the compression stroke will reach and go beyond the compression stroke top dead center (TDC) overwhelming a compressive reaction force. It is therefore essential for the cylinder 12 stopped halfway on the compression stroke to hold a sufficient quantity of air necessary for combustion to ensure reliable engine restart. For this purpose, it is preferable to expel burned gas from and supply fresh air into the cylinder 12 which will be on the expansion stroke at engine stop before the engine 1 stops and cause the piston 13 in the same cylinder 12 to stop at a position within a specified range more or less closer to the bottom dead center (BDC) than the middle of the expansion stroke (e.g. within 100° to 120° after TDC or ATDC, in terms of crank angle).

When automatically stopping the engine 1 at idle, the ECU 2 cuts the fuel supply at a specific engine speed slightly higher than an idle speed so that the burned gas is sufficiently expelled from the individual cylinders 12 and, then, the ECU 2 keeps the throttle valves 23 at a specific valve opening for a specific period, or an engine stopping period, during which the engine 1 continues to run by inertia before stopping so that air is introduced in sufficient quantities into the cylinder 12 which will be on the compression stroke at idling engine stop and into the cylinder 12 which will be on the expansion stroke at idling engine stop. In particular, the ECU 2 controls the engine 1 in such a manner that a larger quantity of air is introduced into the cylinder 12 which will be on the expansion stroke at idling engine stop so that the air introduced into the expansion stroke cylinder 12 exerts a greater compressive reaction force than the air introduced into the compression stroke cylinder 12. Controlling the engine 1 in this way ensures that the piston 13 in the expansion stroke cylinder 12 stops at a position more or less closer to BDC than the middle of the expansion stroke.

Furthermore, the ECU 2 of this embodiment detects the engine speed which gradually decreases during the engine stopping period from the crank angle signals fed from the two crank angle sensors 30, 31 and regulates the opening of the throttle valves 23 based on these signal to finely adjust the rate of engine speed decrease by varying the amount of pumping work done by the engine 1 rotating by inertia. In other words, the ECU 2 finely adjusts the rate of engine speed decrease after fuel supply interruption by regulating the opening of the throttle valves 23 so that the piston 13 in the cylinder 12 which will be on the expansion stroke at idling engine stop will stop within the aforementioned specified range suited for engine restart in a reliable fashion.

If the engine 1 is restarted by performing engine restart control operation after the engine 1 is completely stopped by the above-described idling engine stop control operation when an engine restart request is given in the engine stopping period, however, there occurs a large loss of time from the engine restart request to a point of engine restart. Taking this into consideration, the present invention offers the following feature. When the engine restart request is made in the engine stopping period, the fuel is injected into the cylinder 12 which is currently on the expansion stroke and a mixture thus produced in the same cylinder 12 is ignited and burnt. On the other hand, when the cylinder 12 which was on the compression stroke at the moment of the engine restart request goes beyond TDC into the expansion stroke, a mixture in this cylinder 12 is also ignited and burnt. These two cylinders 12 together give a forward running force to the engine 1 so that the engine 1 can quickly start up even when the engine restart request is given in the engine stopping period.

Engine Stop Control Operation

Figure 3:
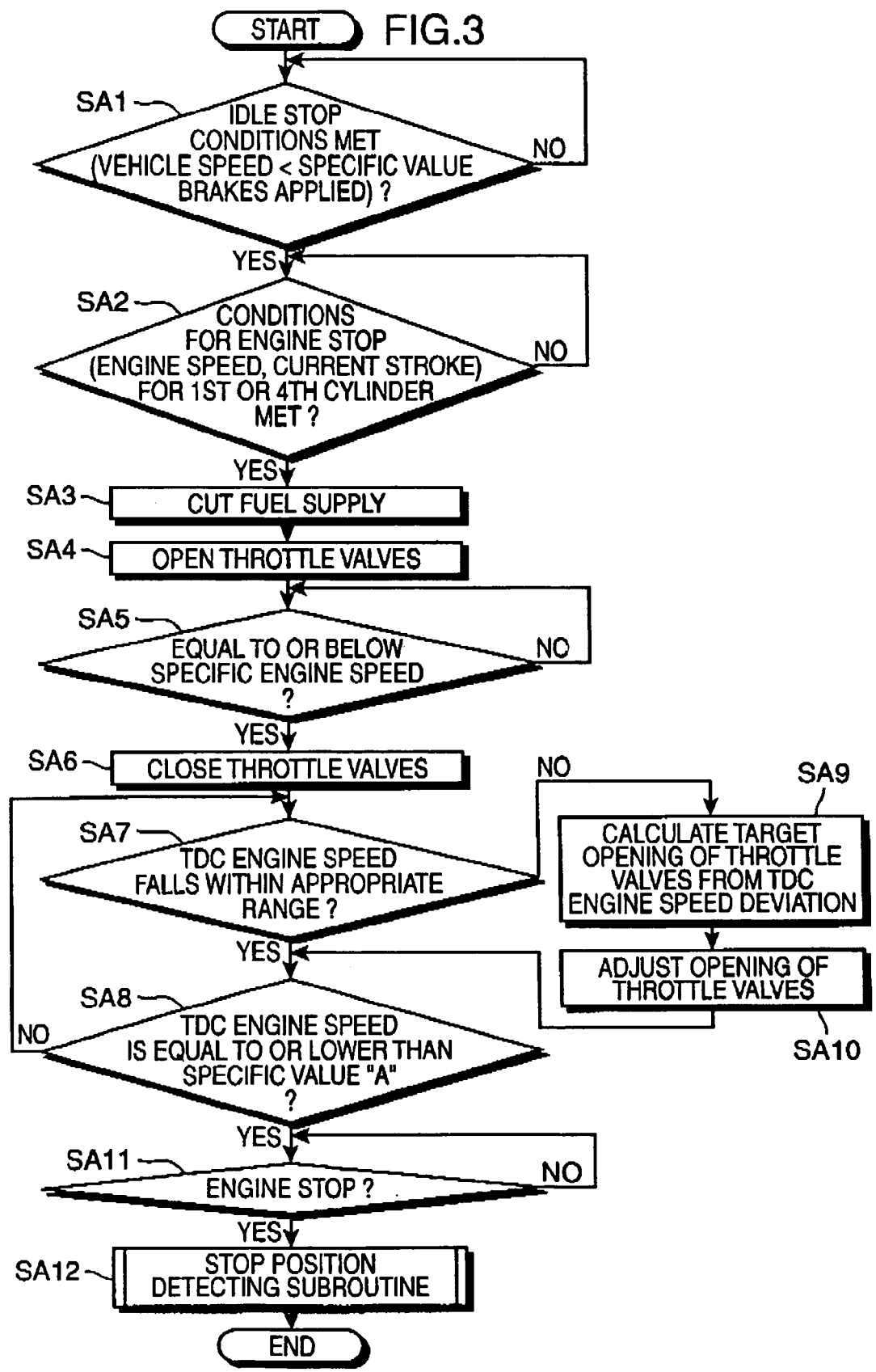
FIG. 3 is a flowchart of an engine stop control operation routine performed for automatically stopping the engine at idle.
Figure 5:
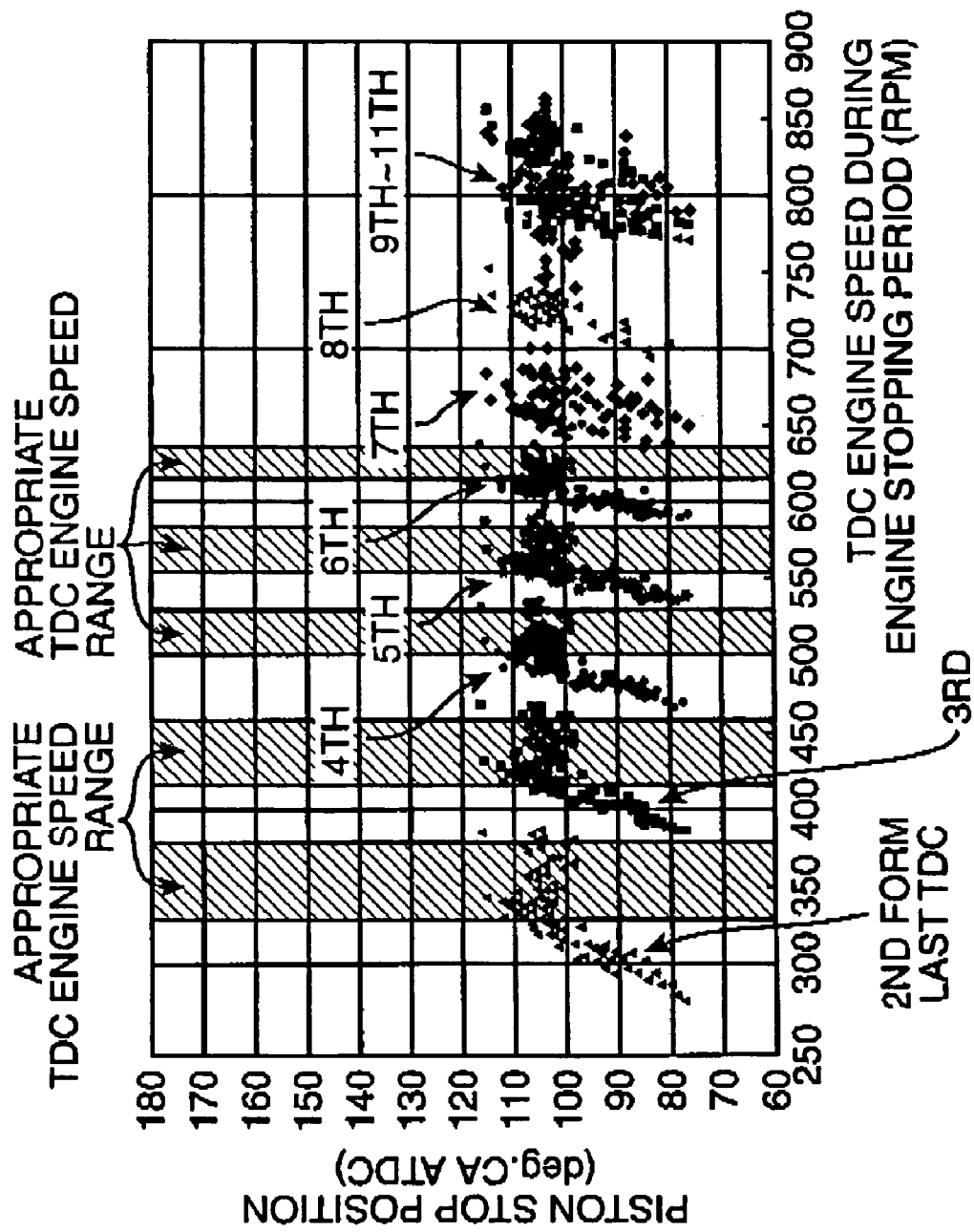
FIG. 5 is a distribution chart showing how decreases in TDC engine speed during the engine stopping period are correlated with piston stop position in the cylinder which is on an expansion stroke at engine stop.

Engine stop control operation performed by the ECU 2 is described in detail referring to FIGS. 3, 4A–4E and 5. FIG. 3 is a flowchart showing an engine stop control operation routine. FIGS. 4A–4E are diagrams schematically showing how the engine speed and the crank angle vary in the successive strokes of the individual cylinders 12A–12D during the engine stopping period as well as how the throttle opening is controlled and the intake air pressure (intake air pipe negative pressure) varies during the same period. FIG. 5 is a distribution chart showing how decreases in later discussed TDC engine speed during the engine stopping period are correlated with piston stop positions in the cylinder 12 which will be on the expansion stroke at engine stop.

Referring to FIG. 4A, if the fuel supply is cut at time t0 when the engine 1 is at a preset engine speed (approximately 800 rpm in the illustrated example), kinetic energy possessed by various moving parts, such as the pistons 13, the crankshaft 3 and a flywheel, is consumed by mechanical friction and pumping work, for instance, so that the engine speed gradually decreases after fuel supply interruption. The engine 1 eventually stops after rotating several times by inertia. During the engine stopping period when the engine 1 continues to run by inertia, the engine speed briefly decreases and increases again in repetitive cycles as the pistons 13 in the individual cylinders 12 reach and go beyond the compression stroke TDC. The engine speed gradually approaches zero while going up and down repetitively at intervals of 180° crank angle in this way. If the fuel supply is cut at an engine speed of approximately 800 rpm as in the example of FIG. 4A, the engine 1 typically goes through 8 or 9 successive TDCs. When the piston 13 in a particular cylinder 12 can not go beyond the compression stroke TDC after the piston 13 in the preceding cylinder 12 has lastly gone beyond the compression stroke TDC (time t3). the engine 1 can not rotate any longer and eventually stops (times t4, t5, t6).

More specifically, if the piston 13 in a particular cylinder 12 fails to go beyond the compression stroke TDC, that cylinder 12 (the first cylinder 12A in the illustrated example) is left on the compression stroke. As the piston 13 in the cylinder 12 ascends by inertial force, the air pressure in the cylinder 12 increases and a resultant compressive reaction force causes the piston 13 to be momentarily stopped (time t4) and forced back toward BDC. This backward motion of the piston 13 causes the crankshaft 3 to rotate in the reverse direction so that the engine speed becomes negative as shown in FIG. 4A. Should this situation occur, the air pressure in the cylinder 12 (the second cylinder 12B in the illustrated example) which is currently on the expansion stroke after lastly going beyond the compression stroke TDC increases, producing a compressive reaction force acting on the piston 13 in this cylinder 12 toward BDC. This compressive reaction force causes the piston 13 in the expansion stroke cylinder 12 to be momentarily stopped (time t5) and forced toward BDC. This motion of the piston 13 in the expansion stroke cylinder 12 causes the crankshaft 3 to rotate again in the forward direction so that the engine speed reverts to a positive value.

As the compressive reaction forces act on the pistons 13 in the compression stroke cylinder 12 and the expansion stroke cylinder 12 in opposite directions as discussed above, the pistons 13 in these cylinders 12 stop (time t6) after moving up and down a few times. While positions where these pistons 13 stop are determined generally by the balance between the compressive reaction forces exerted by the compression stroke cylinder 12 and the expansion stroke cylinder 12, the piston stop positions are more or less affected by mechanical friction occurring in the engine 1, so that the piston stop positions vary with the engine speed at a point in time when one of the pistons 13 lastly goes beyond TDC before eventual engine stop.

To ensure that the piston 13 in the cylinder 12 which will be on the expansion stroke at idling engine stop will stop within the aforementioned specified range suited for engine restart, it is necessary to regulate the quantities of air introduced into the two cylinders 12 which will be on the expansion stroke and on the compression stroke at engine stop in such a manner that sufficiently large compressive reaction forces will be exerted by the two cylinders 12 with the compressive reaction force exerted by the expansion stroke cylinder 12 exceeding the compressive reaction force exerted by the compression stroke cylinder 12 by at least a specific amount. To achieve this, the ECU 2 of the present embodiment opens and holds the throttle valves 23 open for a specific period (time t1 to time t2) after fuel supply interruption as shown in FIG. 4C so that the intake air pipe negative pressure decreases (and the intake air quantity increases) for a while as shown in FIG. 4D and, as a result, specific quantities of air are introduced into the cylinders 12 which will be on the expansion stroke and on the compression stroke at engine stop.

In the actual engine 1, however, individual components, Such as the throttle valves 23, the intake ports 17 and the branched intake channels 21a, vary in shape and airflows drawn through these components exhibit different behaviors, causing a certain degree of variations in the quantities of air introduced into the individual cylinders 12 during the engine stopping period. Therefore, even when the throttle valves 23 are controlled to open and close as discussed above, it is difficult to ensure that the pistons 13 in the cylinders 12 which will be on the expansion stroke and on the compression stroke at engine stop will stop at positions within desired ranges in a reliable fashion.

In this embodiment, particular attention is given to the fact that there is a distinct correlation between the aforementioned TDC engine speed (which is the engine speed measured when any of the pistons 13 is at the compression stroke TDC) in the engine stopping period and the position where the piston 13 in the cylinder 12 which will be on the expansion stroke at engine stop will stop as shown in FIG. 5. Taking this correlation into account, the ECU 2 detects the gradually decreasing engine speed from the crank angle signals fed from the two crank angle sensors 30, 31 at successive TDCs occurring at intervals of 180° crank angle (refer to FIG. 4A) and finely adjusts the rate of engine speed decrease by regulating the opening of the throttle valves 23 according to detected engine speed values during the engine stopping period.

After the fuel supply is cut at the engine speed of approximately 800 rpm as stated above, the ECU 2 measures the engine speed each time the piston 13 in each successive cylinder 12 goes beyond TDC while the engine 1 continues to run by inertia. The distribution chart of FIG. 5 shows the correlation between the TDC engine speed so measured during the engine stopping period and the position where the piston 13 in the cylinder 12 which is on the expansion stroke at engine stop stops, the horizontal axis of the chart representing the TDC engine speed and the vertical axis of the chart representing the piston stop position. The distribution chart of FIG. 5 showing the correlation between the TDC engine speed and the piston stop position is obtained by repeating the aforementioned measurement and plotting cycles for a specific number of times during the engine stopping period.

The distribution chart of FIG. 5 does not show the engine speed observed when one of the pistons 13 lastly goes beyond TDC but shows plots of TDC engine speeds observed from a point immediately after fuel supply interruption (or at the ninth TDC from the last TDC) up to a point of TDC next to the last TDC (or at the second TDC from the last TDC). As can be seen from FIG. 5, the TDC engine speeds observed at the ninth to second TDCs from the last TDC are distributed in distinct groups. It is apparent from the plots of TDC engine speeds measured particularly at the sixth to second TDCs from the last TDC that the piston 13 in the cylinder 12 which is on the expansion stroke at engine stop stops within the aforementioned specified range (100° to 120° ATDC in terms of crank angle) suited for engine restart when the measured TDC engine speeds fall within particular ranges (which are hatched in FIG. 5 and hereinafter referred to as appropriate TDC engine speed ranges). The appropriate TDC engine speed ranges vary depending on engine structure and specifications and are therefore experimentally obtained by a procedure discussed above.

In the engine stop control operation of this embodiment, the ECU 2 controls the engine 1 based on the aforementioned correlation between the TDC engine speed and the piston stop position during the engine stopping period. Specifically, the. ECU 2 successively detects the TDC engine speed after fuel supply interruption. If the detected TDC engine speed does not fall within the appropriate TDC engine speed range, the ECU 2 adjusts the opening of the throttle valves 23 to increase or decrease the amount of pumping work done by the individual cylinders 12 according to deviation of the TDC engine speed from the appropriate TDC engine speed range so that the TDC engine speed will fall within the appropriate TDC engine speed range at least before one of the pistons 13 lastly goes beyond TDC. If the engine 1 is so controlled, the amount of kinetic energy possessed by the moving parts of the engine 1 when one of the pistons 13 lastly goes beyond TDC matches the amount of mechanical friction which will subsequently act on the moving parts, and this makes it possible to stop the piston 13 in the cylinder 12 which is on the expansion stroke at engine stop within the aforementioned specified range suited for engine restart in a reliable fashion.

While the present embodiment regulates the opening of the throttle valves 23 to finely adjust the engine speed as discussed above, the invention is not limited to this approach. As an alternative, the engine system B may employ an auxiliary device, such as an alternator, to control operating conditions of the engine 1.

An example of a procedure of the aforementioned engine stop control operation is now described specifically referring to the flowchart of FIG. 3. Operation flow shown in FIG. 3 starts with specific timing while the engine 1 is running. First, the ECU 2 Judges whether specific idle stop conditions have been met in step SA1. This judgment is made based on vehicle speed, braking conditions, engine cooling water temperature, and so on. Specifically, the ECU 2 judges that the idle stop conditions have been met, if the vehicle speed is lower than a specific value, brakes are applied, the engine cooling water temperature is within a specific range and it is not inconvenient to stop the engine 1, for example.

When the idle stop conditions have been satisfied (Yes in step SA1), the ECU 2 judges whether specific conditions necessary for specified one of the cylinders 12 (the first cylinder 12A or the fourth cylinder 12D in the flowchart of FIG. 3) for stopping the engine 1 have been met in step SA2. More specifically, the ECU 2 judges whether the engine 1 has slowed down to the aforementioned preset engine speed (approximately 800 rpm in this embodiment) at which the fuel supply should be cut and the specified cylinder 12 is currently on a predetermined stroke (e.g., the intake stroke). When all these conditions have been satisfied (Yes in step SA2), the ECU 2 proceeds to step SA3 and interrupts the fuel supply to the individual cylinders 12A–12D.

Subsequently, the ECU 2 opens the throttle valves 23 to a specific opening in step SA4 and holds the throttle valves 23 at the same opening until the engine speed is judged to be equal to or lower than a specific engine speed (which is the engine speed at time t2 of FIG. 4C) in step SA5. When the engine speed becomes equal to or lower than the specific engine speed (Yes in step SA5), the ECU 2 proceeds to step SA6 and closes the throttle valves 23. As the throttle valves 23 are opened and closed according to the engine speed in this fashion, the quantities of air introduced into the cylinder 12 which will be on the expansion stroke at engine stop (the second cylinder 12B in the illustrated example) and into the cylinder 12 which will be on the compression stroke at engine stop (the first cylinder 12A in the illustrated example) increase as shown in FIGS. 4A and 4D, the quantity of air introduced into the cylinder 12 which will be on the expansion stroke at engine stop being larger than the quantity of air introduced into the cylinder 12 which will be on the compression stroke at engine stop. Consequently, it is possible to stop the piston 13 in the cylinder 12 which is on the expansion stroke at engine stop within the aforementioned specified range suited for engine restart.

Proceeding next to step SA7, the ECU 2 judges whether the TDC engine speed obtained from the signal output from the first crank angle sensor 30 falls within one of the aforementioned appropriate TDC engine speed ranges. If the measured TDC engine speed falls within the appropriate TDC engine speed range (Yes in step SA7), the ECU 2 proceeds to step SA8 and judges whether the TDC engine speed is equal to or lower than a specific value "A". This specific value "A", which will be later discussed in detail, is an experimentally determined preset value corresponding to the TDC engine speed lastly measured before engine stop. If the TDC engine speed obtained in step SA7 is equal to or lower than the specific value "A" (Yes in step SA8), the engine 1 can not go beyond the succeeding TDC and stops, so that the ECU 2 proceeds to step SA11 which will be later discussed. If the TDC engine speed obtained in step SA7 is higher than the specific value "A" (No in step SA8) on the contrary, the engine 1 will go beyond the succeeding TDC, so that the ECU 2 returns to step SA7.

If the measured TDC engine speed is judged to be out of the appropriate TDC engine speed range (No in step SA7), the ECU 2 proceeds to step SA9, in which the ECU 2 calculates a target opening of the throttle valves 23 based on the deviation of the TDC engine speed from the appropriate TDC engine speed range. Then, the ECU 2 adjusts the throttle valves 23 to the target opening by activating the actuator 24 and proceeds to step SA8 mentioned above. Specifically, the ECU 2 controls the engine 1 as follows in a loop formed by steps SA7 to SA10. If the measured TDC engine speed is higher than an upper limit of the appropriate TDC engine speed range, the ECU 2 causes the actuator 24 to decrease the opening of the throttle valves 23, so that the amount of pumping work done by the individual cylinders 12 increases and the engine speed decreases at a higher rate. Contrary to this, if the measured TDC engine speed is lower than a lower limit of the appropriate TDC engine speed range, the ECU 2 causes the actuator 24 to increase the opening of the throttle valves 23, so that the amount of pumping work done by the individual cylinders 12 decreases and the engine speed decreases at a lower rate.

As the ECU 2 controls the engine 1 in the aforementioned manner, the engine speed which gradually decreases while going up and down repetitively as shown in FIG. 4A is shifted to a higher or lower side as a whole and the TDC engine speed falls within the appropriate TDC engine speed range at least before one of the pistons 13 lastly goes beyond TDC. This makes it possible to stop the piston 13 in the cylinder 12 which is on the expansion stroke at engine stop within the aforementioned specified range suited for engine restart in a reliable fashion.

When one of the pistons 13 lastly goes beyond TDC and the measured TDC engine speed becomes equal to or lower than the aforementioned specific value "A" (Yes in step SA8), the ECU 2 proceeds to step SA11, in which the ECU 2 judges whether the engine 1 has completely stopped or not. More specifically, the ECU 2 judges whether the crankshaft 3 has stopped after repeatedly rotating in the forward and reverse directions a few times due to the compressive reaction forces exerted in opposite directions by the two cylinders 12 which are on the expansion stroke and on the compression stroke at engine stop. If the judgment result in step SA11 is in the affirmative with the engine 1 judged to have completely stopped, the ECU 2 proceeds to step SA12 to perform a later discussed stop position detecting subroutine in which the ECU 2 detects the piston stop position in the cylinder 12 which is on the expansion stroke at engine stop. The ECU 2 stores the detected piston stop position in an internal memory and quits the engine stop control operation routine of FIG. 3.

Since the crankshaft 3 repeatedly rotates in the forward and reverse directions a few times as mentioned above immediately before the engine 1 completely stops, it is impossible to detect the piston stop position in the expansion stroke cylinder 12 by just counting pulses of the first crank angle signal CA1 output from the first crank angle sensor 30. For this reason, the ECU 2 determines the piston stop position in the expansion stroke cylinder 12 by detecting the direction and angle of rotation of the crankshaft 3 based on the mutually phase-offset crank angle signals output from the two crank angle sensors 30, 31 as will be discussed in detail below.

FIG. 6 is a flowchart showing the aforementioned stop position detecting subroutine for detecting the piston stop position in the cylinder 12 which is on the expansion stroke at engine stop. After operation flow shown in FIG. 6 has begun, the ECU 2 first judges in step SC1, based on the first crank angle signal CA1 output from the first crank angle sensor 30 and the second crank angle signal CA2 output from the second crank angle sensor 31, whether the second crank angle signal CA2 is Low at each rising edge of the first crank angle signal CA1 and High at each falling edge of the first crank angle signal CA1 or the second crank angle signal CA2 is Low at each falling edge of the first crank angle signal CA1 and High at each rising edge of the first crank angle signal CA1. In other words, the ECU 2 Judges whether the first and second crank angle signals CA1, CA2 are phase-offset as shown in FIG. 7A indicating that the crankshaft 3 is rotating in the forward direction or the first and second crank angle signals CA1, CA2 are phase-offset as shown in FIG. 7B indicating that the crankshaft 3 is rotating in the reverse direction in step SC1.

More specifically, when the engine 1 runs in the forward direction, the second crank angle signal CA2 lags the first crank angle signal CA1 in phase by about half the pulselength and, therefore, the second crank angle signal CA2 becomes Low at the rising edge of each successive pulse of the first crank angle signal CA1 and High at the falling edge of each successive pulse of the first crank angle signal CA1 as shown in FIG. 7A. When the engine 1 runs in the reverse direction, on the contrary, the second crank angle signal CA2 leads the first crank angle signal CA1 in phase by about half the pulselength and, therefore, the second crank angle signal CA2 becomes High at the rising edge of each successive pulse of the first crank angle signal CA1 and Low at the falling edge of each successive pulse of the first crank angle signal CA1 as shown in FIG. 7B.

If the engine 1 is judged to be running in the forward direction (Yes in step SC1), the ECU 2 increments a count value of a crank angle counter for measuring changes in the crank angle. If the engine 1 is judged to be running in the reverse direction (No in step SC1), on the other hand, the ECU 2 decrements the count value of the crank angle counter. The rising edges and the falling edges of the first crank angle signal CA1 and those of the second crank angle signal CA2 occur at intervals of a specific angle of rotation of the crankshaft 3. In this embodiment, the interval from one rising edge to the next, and from one falling edge to the next, is approximately 10° for both the first and second crank angle signals CA1, CA2. Since the intervals between the successive rising edges and between the falling edges preset as stated above, it is possible to judge whether the engine 1 is running in the forward or reverse direction based on the state of the second crank angle signal CA2 at each rising edge and falling edge of the first crank angle signal CA1 and to determine the angle of rotation of the crankshaft 3 from the numbers of rising edges or falling edges of the first and second crank angle signals CA1, CA2. Therefore, the ECU 2 can detect the exact piston stop position in the cylinder 12 which is on the expansion stroke at engine stop even though the crankshaft 3 rotates in both the forward and reverse directions before the engine 1 completely stops.

According to the engine stop control operation of the embodiment so far described, the ECU 2 finely adjusts the rate of engine speed decrease by regulating the opening of the throttle valves 23 based on the detected TDC engine speed during the engine stopping period after fuel supply interruption when automatically stopping the engine 1 at idle, so that the TDC engine speed falls within the aforementioned appropriate TDC engine speed range and the piston 13 in the cylinder 12 which is on the expansion stroke at engine stop stops at a position within the aforementioned specified range in the expansion stroke suited for engine restart. Since the engine 1 rotates several times by inertia during the engine stopping period, almost all of the burned gas is expelled out of the individual cylinders 12. After the engine 1 has stopped, in-cylinder pressure swiftly drops even in the expansion stroke cylinder 12 and the compression stroke cylinder 12 of which intake and exhaust valves 19, 20 are closed, and all of the cylinders 12 are filled with fresh air which is approximately at atmospheric pressure.

Engine Restart Control Operation

Figure 9:
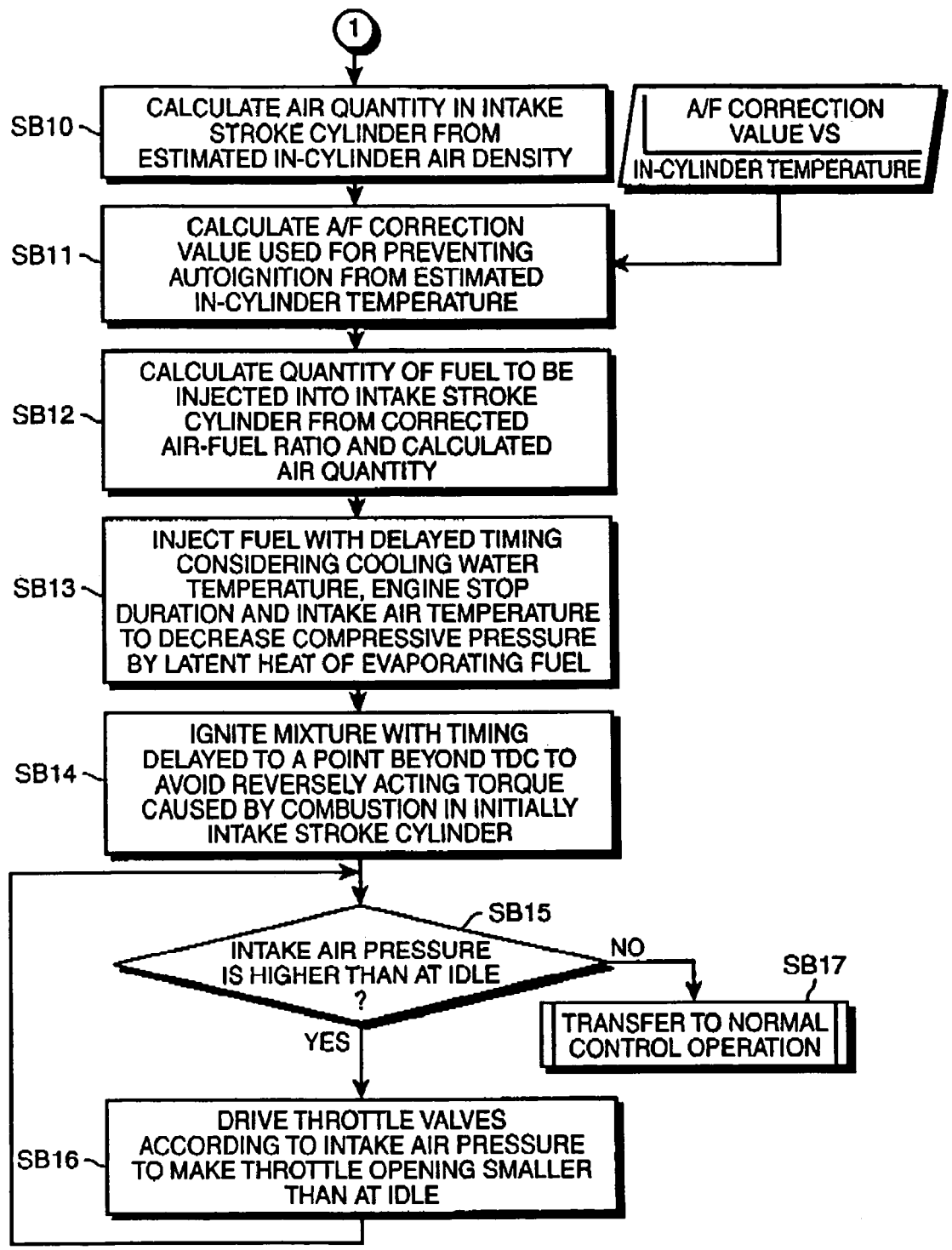
FIG. 9 is a flowchart showing a second half of the engine restart control operation routine performed for automatically restarting the engine from idle stop.

Engine restart control operation performed by the ECU 2 for automatically restarting the engine 1 which has been stopped at idle is now described referring to FIGS. 8, 9, 10 and 11A–11F. FIGS. 8 and 9 are flowcharts showing first and second halves of an engine restart control operation routine. FIG. 10 is a diagram showing fuel injection and ignition timings for the individual cylinders 12A–12D at engine restart in relation to the timing of the successive strokes and opening action of the intake and exhaust valves 19, 20. FIGS. 11A–11F are time charts showing how the engine speed, the pressure in the individual cylinders 12A–12D and the amount of torque generated by the engine 1 vary during engine restart.

A specific example of a procedure of the engine restart control operation is described referring to the flowcharts of FIGS. 8 and 9. Operation flow shown in FIGS. 8 and 9 begins after the engine 1 has been stopped by the aforementioned engine stop control operation routine (FIG. 3). First in step SB1, the ECU 2 judges whether the aforementioned specific conditions for engine restart have been met. If the engine restart conditions have not been satisfied yet (No in step SB1), the BCU 2 waits until the conditions are met.

The engine restart conditions, fulfillment of which is judged in step SB1, include such conditions as the brakes are released or the accelerator pedal is depressed for restarting the engine 1 from idle stop, or an air conditioner is switched on requiring the engine 1 to be restarted. When any of such conditions have been satisfied (Yes in step SB1), the ECU 2 proceeds to step SB2, in which the ECU 2 calculates the quantities of air in the cylinder 12 which is on the compression stroke at engine stop (the first cylinder 12A as illustrated in FIGS. 10 and 11A–11F) and in the cylinder 12 which is on the expansion stroke at engine stop (the second cylinder 12B as illustrated in FIGS. 10 and 11A–11F) based on the stop positions of the pistons 13 determined from count values of the crank angle signals. More specifically, the ECU 2 calculates current volumes of the combustion chambers 14 in the compression stroke cylinder 12 and the expansion stroke cylinder 12 based on the stop positions of the pistons 13 and determines the quantities of air in the compression stroke cylinder 12 and the expansion stroke cylinder 12 in step SB2 taking into consideration the fact that the expansion stroke cylinder 12 is filled almost entirely with fresh air which is approximately at atmospheric pressure at engine stop as stated earlier.

In succeeding step SB3, the ECU 2 causes the fuel injector 16 of the cylinder 12 which is on the compression stroke at engine stop to inject the fuel such that a specific air-fuel ratio (first-time air-fuel ratio for the compression stroke cylinder 12) is produced with the quantity of air in the compression stroke cylinder 12 calculated in step SB2 above. Here, the air-fuel ratio is determined from a preprogrammed map which defines desired air-fuel ratios in relation to the piston stop position in the compression stroke cylinder 12 at engine stop, for instance. Specifically, the air-fuel ratio in the compression stroke cylinder 12 is set to a value smaller than the stoichiometric air-fuel ratio (i.e., within a range of approximately 11 to 14 in terms of the air-fuel ratio).

In succeeding step SB4, the ECU 2 causes the spark plug 15 of the compression stroke cylinder 12 to ignite a mixture produced therein after a lapse of a particular time period which is preset in consideration of fuel evaporation time required after fuel injection into the cylinder 12. Then, in step SB5, the ECU 2 judges whether the piston 13 in the compression stroke cylinder 12 has moved based on whether the rising and falling edges of the crank angle signals CA1, CA2 output from the crank angle sensors 30, 31 have been detected within a specific time from ignition in step SB4. (Refer to FIGS. 6, 7A and 7B for details of how the ECU 2 detects the rising and falling edges of the crank angle signals CA1, CA2.) If the piston 13 in the compression stroke cylinder 12 has not moved (No in step SB5) due to misfire, for instance, the ECU 2 proceeds to step SB6, in which the ECU 2 causes the spark plug 15 of the compression stroke cylinder 12 to reignite the mixture.

If the edges of the crank angle signals CA1, CA2 are detected (Yes in step SB5) indicating that the piston 13 in the compression stroke cylinder 12 has moved, or the engine 1 has run in the reverse direction, the ECU 2 proceeds to step SB7, in which the ECU 2 causes the fuel injector 16 of the cylinder 12 which is on the expansion stroke at engine stop to inject the fuel such that a specific air-fuel ratio for the expansion stroke cylinder 12 is produced with the quantity of air in the expansion stroke cylinder 12 calculated in step SB2 above. Here again, the air-fuel ratio is determined from a preprogrammed map which defines desired air-fuel ratios in relation to the piston stop position in the expansion stroke cylinder 12 at engine stop, for instance. Specifically, the air-fuel ratio in the expansion stroke cylinder 12 is set to a value equal to or slightly smaller than the stoichiometric air-fuel ratio.

In succeeding step SB8, a mixture produced in the expansion stroke cylinder 12 is sufficiently compressed as the piston 13 in the expansion stroke cylinder 12 ascends due to reverse running of the engine 1. The ECU 2 causes the spark plug 15 of the expansion stroke cylinder 12 to ignite the mixture produced therein after a lapse of a particular time period (ignition delay time) during which the piston 13 in the expansion stroke cylinder 12 almost stops due to the compressive reaction force exerted by the expansion stroke cylinder 12. Since the mixture compressed in the expansion stroke cylinder 12 is ignited and burnt in this manner, the engine 1 begins to run in the forward direction. The aforementioned ignition delay time corresponds generally to a period of time required for the piston 13 in the expansion stroke cylinder 12 to reach the vicinity of TDC due to reverse running of the engine 1 and is determined from a preprogrammed map which defines appropriate ignition delay times in relation to the piston stop position at engine stop.

In succeeding step SB9, the ECU 2 causes the fuel injector 16 of the cylinder 12 which is on the compression stroke at engine stop to inject the fuel with timing determined in consideration of the fuel evaporation time. As a result, the temperature in the compression stroke cylinder 12 drops due to latent heat absorbed by evaporation of the fuel and the pressure in the compression stroke cylinder 12 decreases, so that the compressive reaction force exerted by the compression stroke cylinder 12 decreases, making it easier for the piston 13 in the compression stroke cylinder 12 to go beyond TDC. Hence, the engine 1 which began to run in the forward direction as a result of combustion in the expansion stroke cylinder 12 in step SB8 is caused to run more powerfully in the forward direction and the individual cylinders 12A–12D shift to the succeeding strokes.

Subsequently, the ECU 2 proceeds to step SB10 of FIG. 9, in which the ECU 2 estimates the density of air filled in the cylinder 12 which is on the intake stroke at engine stop (the third cylinder 12C as illustrated in FIGS. 10 and 11A–11F) due to forward running of the engine 1 based on the atmospheric pressure and in-cylinder temperature estimated from the engine cooling water temperature, duration of engine stop and intake air temperature, for instance, and calculates the quantity of air in the intake stroke cylinder 12 based on the estimated in-cylinder air density. Then, the ECU 2 calculates an air-fuel ratio correction value used for preventing autoignition (spontaneous combustion), for instance, mainly from the estimated temperature in the intake stroke cylinder 12 in step SB11. In succeeding step SB12, the ECU 2 calculates an appropriate quantity of fuel to be injected into the intake stroke cylinder 12 based on an air-fuel ratio corrected by the aforementioned correction value and the quantity of air in the intake stroke cylinder 12 calculated in step SB10. Overall, the ECU 2 calculates the quantity of air, the air-fuel ratio correction value and the quantity of fuel to be injected for producing a slightly low air-fuel ratio (rich mixture) of about 13 in the cylinder 12 which is on the intake stroke at engine stop in steps SB10 to SB12 discussed above in order to prevent autoignition due to compressive pressure or in-cylinder temperature when the cylinder 12 initially on the intake stroke goes into a first compression stroke after engine restart and to minimize the compressive reaction force exerted by the same cylinder 12.

When the cylinder 12 which is on the intake stroke at engine stop goes into the compression stroke, the ECU 2 causes the fuel injector 16 of the same cylinder 12 to inject the fuel in a middle part of the compression stroke in step SB13. While the fuel is normally injected in the intake stroke when an ordinary engine is started by a starter motor, the engine 1 of this embodiment injects the fuel in the middle part of the compression stroke at engine restart-taking into consideration the engine cooling water temperature, duration of engine stop and intake air temperature, for instance, so that the in-cylinder compressive pressure efficiently decreases due to latent heat absorbed by evaporation of the fuel. Therefore, the compressive pressure in the cylinder 12 which was on the intake stroke at engine stop efficiently decreases and this also serves to prevent autoignition.

Subsequently, the ECU 2 proceeds to step SB14, in which the ECU 2 causes the spark plug 15 of the cylinder 12 which was on the intake stroke at engine stop (now on the compression stroke) to ignite a mixture after the piston 13 in the same cylinder 12 has gone beyond the compression stroke TDC. While the mixture is normally ignited before the compression stroke TDC in an ordinary engine started by a starter motor, ignition timing is retarded to a point beyond the compression stroke TDC in the engine 1 of this embodiment. This is because a torque acting on the crankshaft 3 in the reverse direction via the piston 13 could impede successful engine restart if the mixture is ignited before the compression stroke TDC in the engine 1 which is started without using any starter motor.

In succeeding step SB15, the ECU 2 judges whether the intake air pressure (intake air pipe negative pressure) in a portion of each branched intake channel 21a downstream of the throttle valve 23 is higher than that at idle. If the intake air pressure in the downstream portion of each branched intake channel 21a is judged to be higher than that at idle (Yes in step SB15), the ECU 2 proceeds to step SB16, in which the ECU 2 drives the throttle valves 23 via the actuator 24 to make the opening of the throttle valves 23 smaller than under normal engine idle conditions according to the intake air pressure to decrease the quantities of air introduced into the combustion chambers 14 of the individual cylinders 12 through a portion of each branched intake channel 21a upstream of the throttle valve 23, and returns to step SB15. The ECU 2 repetitively decreases the opening of the throttle valves 23 in this way until the intake air pressure becomes equal to that at idle. When the intake air pressure becomes equal to or lower than that at idle (No in step SB15), the ECU 2 proceeds to step SB17 and returns to normal control operation.

Steps SB15 and SB16 discussed above restrict the quantities of air introduced into the individual cylinders 12 to prevent a problem that the engine speed could rapidly increase causing severe vibrations of the engine 1 if the cylinders 12 are fully filled with air introduced at engine restart from the surge tank 21b and portions of the intake passage 21 downstream of the surge tank 21b which hold fresh air approximately at atmospheric pressure while the engine 1 is at rest (idle stop).

The engine 1 once stopped automatically at idle can be restarted in response to an engine restart request by the engine restart control operation routine shown in FIGS. 8 and 9 without using a starter motor. Specifically, when an engine restart request is issued under idle engine stop conditions (time 0 in FIGS. 11A–11F), the ECU 2 causes the fuel injector 16 of the cylinder 12 which is on the compression stroke at engine stop (the first cylinder 12A in the illustrated example) to inject the fuel at a point shown by the symbol a1 in FIGS. 10 and 11A–11F and causes the spark plug 15 of the same cylinder 12 to ignite a mixture produced therein at a point shown by the symbol a2, so that the engine 1 runs in the reverse direction (leftward direction as illustrated in FIG. 10). As the engine 1 runs in the reverse direction, compressive pressure in the cylinder 12 which is on the expansion stroke at engine stop (the second cylinder 12B in the illustrated example) increases. Then, the ECU 2 causes the fuel injector 16 of the cylinder 12 which is on the expansion stroke at engine stop to inject the fuel at a point shown by the symbol a3 and causes the spark plug 15 of the same cylinder 12 to ignite a mixture produced therein at a point shown by the symbol a4, so that the engine 1 runs in the forward direction (rightward direction as illustrated in FIG. 10).

Then, the ECU 2 causes the fuel injector 16 of the cylinder 12 which was on the compression stroke at engine stop (the first cylinder 12A) to inject the fuel again at a point shown by the symbol a5 before the piston 13 in the same cylinder 12 goes beyond the compression stroke TDC, so that the compressive reaction force exerted by the compression stroke cylinder 12 decreases, making it easier for the piston 13 in the same cylinder 12 to go beyond TDC.

On the other hand, when the cylinder 12 which is on the intake stroke at engine stop (the third cylinder 12C in the illustrated example) goes into the compression stroke, the ECU 2 causes the fuel injector 16 of the same cylinder 12 to inject the fuel to produce a slightly low air-fuel ratio (rich mixture) in the middle part of the compression stroke by retarding fuel injection from an ordinary injection point (normally set in the intake stroke) to a point shown by the symbol a6 to prevent autoignition on the compression stroke of the cylinder 12. Also, ignition timing in the cylinder 12 which is on the intake stroke at engine stop (the third cylinder 12C) is retarded to a point shown by the symbol a7 beyond the compression stroke TDC so that a torque acting on the crankshaft 3 in the reverse direction would not be produced. This arrangement helps increase the engine speed and reliably restart the engine 1.

Furthermore, the opening of the throttle valves 23 is made smaller than under normal engine idle conditions during the engine restart control operation, so that the quantity of air introduced into the cylinder 12 which is on the exhaust stroke at engine stop (the fourth cylinder 12D in the illustrated example) is restricted. In addition, the cylinder 12 which is on the exhaust stroke at engine stop (the fourth cylinder 12D) is controlled in the same way as the cylinder 12 which is on the intake stroke at engine stop (the third cylinder 12C) at points shown by the symbols a8 and a9. This serves to prevent a rapid increase in the engine speed and severe vibrations of the engine 1.

Engine Restart Control Operation Performed During Engine Stopping Period

If the engine 1 is restarted by performing the aforementioned engine restart control operation after the engine 1 is completely stopped by the aforementioned idling engine stop control operation when an engine restart request is issued in the engine stopping period, there occurs a large loss of time from the engine restart request to a point of engine restart. For this reason, when an engine restart request is made immediately before engine stop, the ECU 2 of the invention causes the fuel injector 16 of the cylinder 12 which is currently on the expansion stroke to inject the fuel and causes the spark plug 15 of the same cylinder 12 to ignite and burn a mixture produced therein without waiting for complete engine stop.

If the cylinder 12 which is on the compression stroke when an engine restart request is issued in the engine stopping period is in a state in which the piston 13 of the same cylinder 12 can go beyond the succeeding TDC, the ECU 2 causes the fuel injector 16 of the compression stroke cylinder 12 to inject the fuel and causes the spark plug 15 of the same cylinder 12 to ignite and burn a mixture produced therein in this embodiment. If, on the other hand, the cylinder 12 which is on the compression stroke can not go beyond the succeeding TDC and an engine restart request is issued before the engine 1 rotates in the reverse direction due to the compressive reaction force exerted by the compression stroke cylinder 12, a mixture in the cylinder 12 which is currently on the expansion stroke is combusted to give a forward running force to the engine 1 and restart the engine 1.

In a case where the engine 1 is restarted by combustion in the cylinder 12 which is on the expansion stroke as mentioned above, it is possible to obtain a sufficient torque by immediately igniting and burning the mixture in the expansion stroke cylinder 12 when the piston 13 in the same cylinder 12 is located near TDC. When the piston 13 in the expansion stroke cylinder 12 is located away from TDC, however, it is not possible to obtain a sufficient torque, resulting in a potential failure to restart the engine 1, even if the mixture in the cylinder 12 is combusted in response to the engine restart request. This is because the pressure in the expansion stroke cylinder 12 is low and the distance traveled by the piston 13 in the expansion stroke cylinder 12 by combustion therein is too short in this case when the piston 13 in the expansion stroke cylinder 12 is located away from TDC.

Under these circumstances, the present embodiment employs an arrangement for controlling the engine 1 as follows. If the engine restart request is given under conditions where the engine 1 is immediately before stopping, in which the piston 13 in the compression stroke cylinder 12 can not go beyond the succeeding TDC and a sufficient torque can not be obtained even if the mixture in the expansion stroke cylinder 12 is combusted with the piston 13 in the expansion stroke cylinder 12 located relatively far from TDC, the engine 1 is caused to run slightly in the reverse direction to compress the mixture in the expansion stroke cylinder 12 and the compressed mixture is combusted therein to give a sufficient starting torque to the engine 1.

When the engine speed becomes extremely low, however, the engine 1 rotates in the reverse direction after momentarily stopping due to the compressive reaction force exerted by the compression stroke cylinder 12 and, then, rotates repeatedly in the forward and reverse directions a few times. If the engine restart request is given when the engine 1 rotates for the first time in the reverse direction, the compressive reaction force exerted by the compression stroke cylinder 12 is still sufficiently large and, therefore, it is possible to obtain a sufficient torque by compressing the mixture in the expansion stroke cylinder 12 with reverse running motion of the engine 1 as stated above. If the engine restart request is given when the engine 1 is repeatedly rotating in the forward and reverse directions, however, the mixture in the expansion stroke cylinder 12 can not be compressed sufficiently by the reverse running motion of the engine 1 alone and, therefore, it is impossible to obtain a sufficient torque by combustion in the expansion stroke cylinder 12 and this makes it difficult to restart the engine 1.

Accordingly, if the engine restart request is given after the rotational direction of the engine 1 has changed from the forward direction to the reverse direction and then back to the forward direction, the mixture in compression stroke cylinder 12 is combusted to give a reversing torque to the engine 1 and thereby compress the mixture in the expansion stroke cylinder 12 sufficiently. Then, after the rotational direction of the engine 1 has changed from the reverse direction to the forward direction due to the compressive reaction force exerted by the compressed mixture in the expansion stroke cylinder 12, the mixture in the expansion stroke cylinder 12 is combusted to give a sufficient starting torque to the engine 1 to quickly restart the engine 1 in a more reliable fashion.

Engine restart control operation performed by the ECU 2 when an engine restart request is issued in the engine stopping period is now described referring to FIGS. 12–15, 16A–16B, 17A–17C, 18A–18C, 19A–19C, 20A–20C and 21A–21C. FIGS. 12–15 are flowcharts showing first to fourth parts of an engine restart control operation routine performed when the engine restart request is issued in the engine stopping period. FIGS. 16A–16B, 17A–17C, 18A–18C, 19A–19C, 20A–20C and 21A–21C are diagrams showing fuel injection and ignition timings for the individual cylinders 12A–12D at engine restart in the engine stopping period in relation to the engine speed, the crank angle, and the timing of the successive strokes of the individual cylinders 12A–12D.

A specific example of a procedure of the engine restart control operation performed when the engine restart request is given in the engine stopping period is described referring to the flowcharts of FIGS. 12 to 15. Operation flow shown in FIG. 12 begins when the engine 1 is running. First in step SD1, the ECU 2 resets a count value of a reverse run counter which is used for judging the number of reverse running motions of the engine 1 in later described step SD17, for instance. In this embodiment, the ECU 2 differently performs the engine restart control operation according to the number of reverse-running motions counted by the reverse run counter when rotational inertial force of the engine 1 is small (or when the TDC engine speed is equal to or lower than a specific value as will be later discussed in detail).

Proceeding to step SD2, the ECU 2 judges whether the idle stop conditions have been met. When the idle stop conditions have been satisfied (Yes in step SD2), the ECU 2 proceeds to step SD3, in which the ECU 2 judges whether the conditions for stopping the engine 1 (e.g., the engine speed) have been met. When the engine stop conditions have been satisfied (Yes in step SD3). the ECU 2 proceeds to step SD4 and interrupts the fuel supply to the individual cylinders 12A–12D. Then, the ECU 2 opens the throttle valves 23 to a specific opening in step SD5. It is to be noted that steps SD2 to SD5 discussed above are identical to steps SA1 to SA4 of the earlier-described engine stop control operation routine (FIG. 3).

In succeeding step SD6, the ECU 2 Judges whether the aforementioned specific engine restart conditions (the brakes are released, the accelerator pedal is depressed, or the air conditioner is switched on) have been met. When the engine restart conditions have been satisfied (Yes in step SD6), the ECU 2 skips to step SD7 of FIG. 13, in which the ECU 2 continues to perform the engine restart control operation according to the TDC engine speed as will be later discussed further. If the engine restart conditions are judged to be unsatisfied yet (No in step SD6), the ECU 2 proceeds to step SD8, in which the ECU 2 judges whether the engine speed is equal to or lower than the earlier-mentioned specific engine speed in the same way as step SA5 of the routine of FIG. 3. When the engine speed becomes equal to or lower than the specific engine speed (Yes in step SD8). the ECU 2 proceeds to step SD9, in which the ECU 2 closes the throttle valves 23. If the engine speed is higher than the specific engine speed (No in step SD8), on the other hand, the ECU 2 returns to step SD6 and waits until the engine restart conditions are satisfied or the engine speed becomes equal to or lower than the specific engine speed.

In step SD10 succeeding to step SD9, the ECU 2 judges whether the rotational direction of the engine 1 has changed from the forward direction to the reverse direction immediately before the engine 1 stops. If the rotational direction of the engine 1 has changed from the forward direction to the reverse direction (Yes in step SD10), the ECU 2 proceeds to step SD11 to increment the count value of the reverse run counter by 1 and then proceeds to step SD12. If the rotational direction of the engine 1 has not changed from the forward direction to the reverse direction (No in step SD10), the ECU 2 directly proceeds to step SD12. After one of the pistons 13 has lastly gone beyond TDC (time t3 shown in FIG. 4) before engine stop, the engine 1 repeatedly rotates in the forward and reverse directions a few times before stopping due to the compressive reaction forces exerted in opposite directions by the cylinders 12 which are on the expansion stroke and on the compression stroke and, therefore, the pistons 13 in the individual cylinders 12A–12D stop after moving up and down a few times as previously discussed. The reverse run counter counts the number of reverse running motions, that is, the number of reversing motions of the engine 1 from the forward direction, in steps SD10 and SD11 discussed above to enable the ECU 2 to perform the engine restart control operation according to the number of reverse running motions of the engine 1 from later described step SD17 onward.

In succeeding step SD12, the ECU 2 judges again whether the aforementioned specific engine restart conditions have been met. When the engine restart conditions have been satisfied (Yes in step SD12), the ECU 2 proceeds to step SD13, in which the ECU 2 opens the throttle valves 23 to a specific opening and proceeds to step SD7. If the engine restart conditions are not satisfied (No in step SD12), the ECU 2 proceeds to step SD14, in which the ECU 2 judges whether the engine 1 has completely stopped or not in the same way as step SA11 of the routine of FIG. 3. If the judgment result in step SD14 is in the affirmative with the engine 1 judged to have completely stopped, the ECU 2 stores the detected piston stop position in the internal memory and quits the operation flow of FIG. 12. In this case (Yes in step SD14), the ECU 2 transfers to the aforementioned engine restart control operation routine of FIGS. 8 and 9 and begins the engine restart control operation after waiting for fulfillment of the engine restart conditions upon engine stop (step SB1). If the engine 1 has not stopped yet (No in step SD14), the ECU 2 returns to step SD10 and counts the number of reverse running motions of the engine 1 until the engine restart conditions are satisfied or the engine 1 completely stops.

Figure 12A:
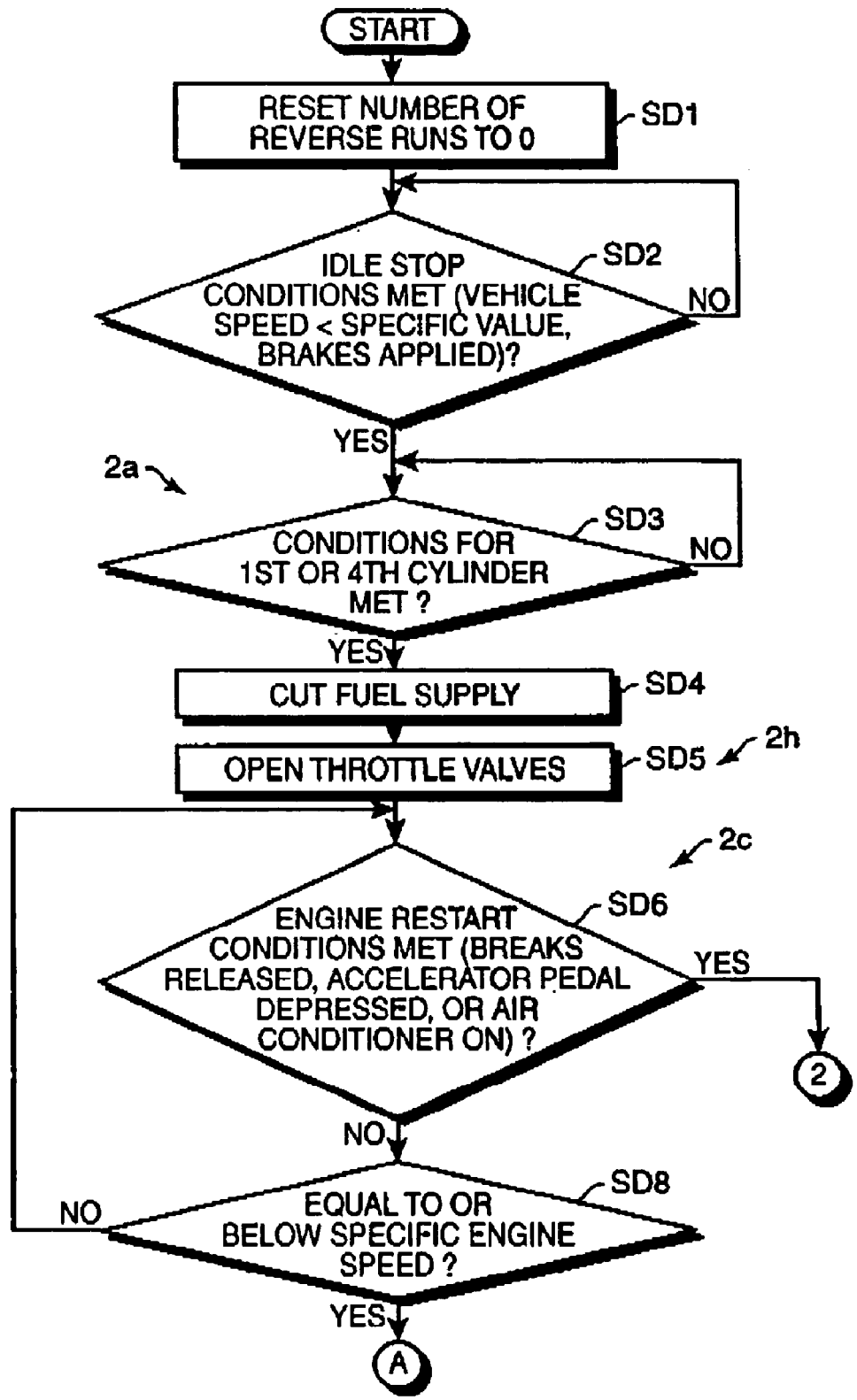
FIGS. 12A and 12B are flowcharts showing a first part of an engine restart control operation routine performed when an engine restart request is given in the engine stopping period.
Figure 12B:
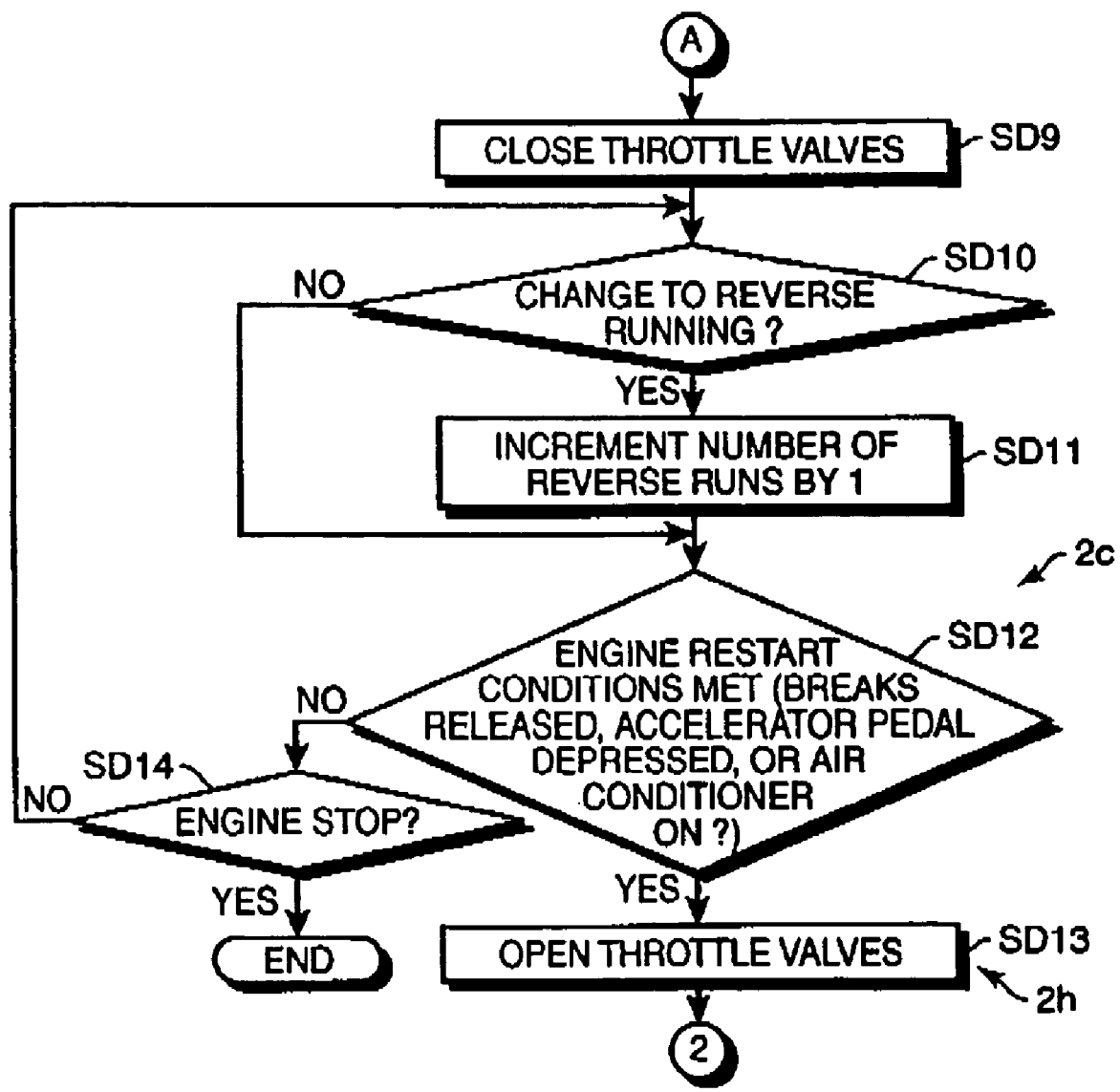

Although not shown in the operation flow of FIG. 12, the ECU 2 controllably regulates, or corrects the opening of the throttle valves 23 according to the TDC engine speed in the same way as steps SA7 to SA10 of the routine of FIG. 3 if the engine restart conditions are not satisfied after closing the throttle valves 23 in step SD9. Then, in step SD7 of FIG. 13 to which the ECU 2 proceeds from step SD6 or SD12 (FIG. 12) when the engine restart conditions have been satisfied, the ECU 2 judges whether the TDC engine speed measured when one of the pistons 13 has lastly gone beyond TDC immediately before fulfillment of the engine restart conditions is higher than the-same specific value "A" (specific engine speed) as mentioned earlier in step SA8 of the routine of FIG. 3. This specific value "A" of the engine speed is for judging whether the piston 13 in the cylinder 12 on the compression stroke can go beyond the succeeding TDC. Thus, the specific value "A" should be set to a value at which the compressive reaction force exerted by the compression stroke cylinder 12 becomes approximately equal to the rotational inertial force of the engine 1 at the succeeding TDC, for example.

In other words, the ECU 2 judges whether the engine 1 is immediately before stopping or not depending on whether the piston 13 in the compression stroke cylinder 12 can go beyond the succeeding TDC based on the engine speed measured upon fulfillment of the engine restart conditions in step SD7. If the measured TDC engine speed is higher than the specific value "A" and the piston 13 in the compression stroke cylinder 12 is presumed to be capable of going beyond TDC (Yes in step SD7), the ECU 2 proceeds to step SD15, in which the ECU 2 causes the fuel injector 16 of the compression stroke cylinder 12 to inject the fuel and causes the spark plug 15 of the same cylinder 12 to ignite a mixture produced therein. Subsequently, the ECU 2 returns to the normal control operation in step SD16.

If the measured TDC engine speed is equal to or lower than the specific value "A" and the piston 13 in the compression stroke cylinder 12 is presumed to be incapable of going beyond TDC (No in step SD7), the ECU 2 proceeds to later discussed step SD17 onward to perform the engine restart control operation in an optimum manner according to the rotational direction of the engine 1 and the position of the piston 13 in the expansion stroke cylinder 12, for instance.

The aforementioned value "A" may be set such that the rotational inertial force of the engine 1 at the succeeding TDC exceeds the compressive reaction force exerted by the compression stroke cylinder 12 by a specific amount. Here, this specific amount is determined such that a range of the TDC engine speed equal to or lower than the specific value "A" involves a case in which the piston 13 in the compression stroke cylinder 12 can, or can not, go beyond the succeeding TDC by a small margin, taking into consideration deterioration with the lapse of time and variations in the properties of the engine 1. If the aforementioned value "A" is preset in this way, it is possible to give a sufficient starting torque to the engine 1 and restart the engine 1 in a reliable fashion by performing control operations of later discussed steps SD17 to SD27 when the TDC engine speed is lower than the specific value "A", regardless of deterioration of the engine 1 or TDC engine speed sensing errors, for instance.

In step SD17 succeeding to step SD7, the ECU 2 judges whether the number of reverse running motions of the engine 1 counted by the reverse run counter is 0 or not. If the counted number of reverse running motions of the engine 1 is 0 (Yes in step SD17), the ECU 2 causes the fuel injector 16 of the cylinder 12 which is on the expansion stroke to inject the fuel and causes the spark plug 15 of the same cylinder 12 to ignite and combust a mixture produced therein to restart the engine 1 in succeeding steps SD18 to SD28. If the counted number of reverse running motions of the engine 1 is 1 or more (No in step SD17), on the other hand, the ECU 2 quits the operation flow of FIG. 13 and transfers to later discussed operation flows shown in FIGS. 14 and 15 to restart the engine 1 by performing the engine restart control operation according to the current rotational direction and crank angle of the engine 1.

When the Number of Engine's Reversing Motions is 0

Figure 13:
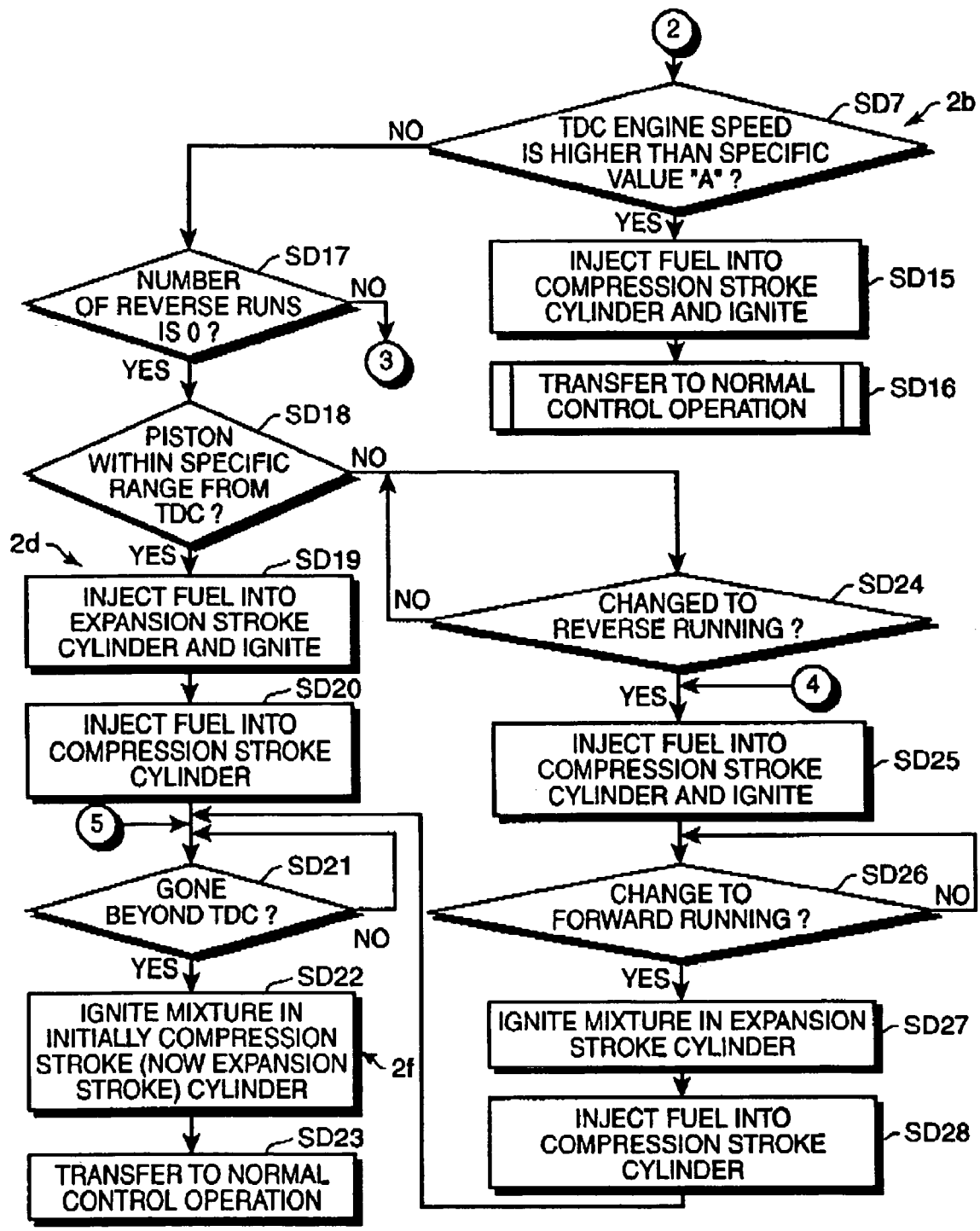
FIG. 13 is a flowchart showing a second part of the engine restart control operation routine performed when the engine restart request is given in the engine stopping period and the number of reverse running motions of the engine is 0.

The engine restart control operation performed when the number of reverse running motions of the engine 1 is 0 (Yes in step SD17) is now described referring to the flowchart of FIG. 13. When the counted number of reverse running motions of the engine 1 is judged to be 0 in step SD17, the ECU 2 proceeds to step SD18, in which the ECU 2 judges whether the piston 13 in the cylinder 12 which is on the expansion stroke at engine stop is within a specific range from TDC in terms of crank angle (e.g., below approximately 20° to 30°), that it, whether the piston 13 in the expansion stroke cylinder 12 is located relatively close to TDC. If the piston 13 in the expansion stroke cylinder 12 is judged to be within this specific range of crank angle (or close to TDC) (Yes in step SD18), the ECU 2 proceeds to step SD19, in which the ECU 2 causes the fuel injector 16 of the expansion stroke cylinder 12 to inject the fuel and causes the spark plug 15 of the same cylinder 12 to ignite a mixture produced therein after a lapse of a particular time period taking into consideration the fuel evaporation time. The ECU 2 then proceeds to step SD20, in which the ECU 2 also causes the fuel injector 16 of the cylinder 12 which is on the compression stroke at engine stop to inject the fuel, so that the temperature in the compression stroke cylinder 12 drops due to latent heat absorbed by evaporation of the injected fuel and the pressure in the same cylinder 12 decreases, making it easier for the piston 13 in the compression stroke cylinder 12 to go beyond TDC. The ECU 2 then waits until the cylinder 12 which was on the compression stroke at engine stop goes beyond TDC into the expansion stroke in step SD21. When the cylinder 12 which was initially on the compression stroke has gone into the expansion stroke, the ECU 2 proceeds to step SD22, in which the ECU 2 causes the spark plug 15 of the same cylinder 12 to ignite a mixture produced therein. Subsequently, the ECU 2 returns to the normal control operation in step SD23.

The ECU 2 performs the aforementioned sequence of steps SD18 to SD23 in a case where the engine restart request is given when the engine 1 is immediately before stopping but still running in the forward direction without rotating to the reverse direction with the piston 13 in the compression stroke cylinder 12 presumed to be incapable of going beyond the succeeding TDC, and the piston 13 in the expansion stroke cylinder 12 is located close to TDC so that a sufficient torque can be obtained by combustion in the expansion stroke cylinder 12. In this case, a starting torque is given to the engine 1 in the forward direction by combustion in the expansion stroke cylinder 12 with the aid of the rotational inertial force of the forward-running engine 1, the fuel is injected into the compression stroke cylinder 12 to make it easier for the piston 13 in the compression stroke cylinder 12 to go beyond TDC, and the mixture produced in the compression stroke cylinder 12 is ignited after the piston 13 in the same cylinder 12 goes beyond TDC, whereby the ECU 2 causes the engine 1 run further in the forward direction and eventually restart.

While the foregoing discussion of the embodiment has disclosed an arrangement in which the fuel is injected into the expansion stroke cylinder 12 and the mixture produced therein is ignited in step SD19 and, then, the fuel is injected into the compression stroke cylinder 12 in step SD20, the invention is not limited to this arrangement. For example, the embodiment may be modified such that the fuel is injected into the compression stroke cylinder 12 almost at the same time as the fuel is injected into the expansion stroke cylinder 12 in step SD19.

If the piston 13 in the expansion stroke cylinder 12 is judged to be outside the aforementioned specific range of crank angle (or located away from TDC) (No in step SD18), on the other hand, the rotational direction of the engine 1 immediately changes to the reverse direction so that the ECU 2 proceeds to a sequence of steps SD24 to SD28. In this sequence, the rotational direction of the engine 1 once changes to the reverse direction so that a mixture produced in the expansion stroke cylinder 12 is compressed, producing a compressive reaction force which causes the engine 1 to rotate in the forward direction again. After the rotational direction of the engine 1 has changed from the reverse direction to the forward direction, the ECU 2 restarts the engine 1 by first combusting the mixture in the expansion stroke cylinder 12.

More specifically, the ECU 2 waits until the rotational direction of the engine 1 changes from the forward direction to the reverse direction in step SD24. When the rotational direction of the engine 1 has changed from the forward direction to the reverse direction (Yes in step SD24), the ECU 2 proceeds to step SD25, in which the ECU 2 causes the fuel injector 16 of the expansion stroke cylinder 12 to inject the fuel. In succeeding step SD26, the ECU 2 waits until the rotational direction of the engine 1 changes from the reverse direction back to the forward direction. Then, in step SD27, the ECU 2 causes the spark plug 15 of the expansion stroke cylinder 12 to ignite and combust the mixture produced therein to give a starting torque to the engine 1 in the forward direction. Next, the ECU 2 causes the fuel injector 16 of the compression stroke cylinder 12 to inject the fuel in step SD28 and proceeds to a sequence of steps SD21 to SD23 discussed above, in which the ECU 2 waits until the piston 13 in the compression stroke cylinder 12 goes beyond TDC and causes the spark plug 15 of the same cylinder 12 (now on the expansion stroke) to ignite a mixture produced therein. Subsequently, the ECU 2 returns to the normal control operation in step SD23.

The ECU 2 performs the aforementioned sequences of steps SD24 to SD28 and steps SD21 to SD23 in a case where the engine restart request is given when the engine 1 is immediately before stopping with the piston 13 in the compression stroke cylinder 12 presumed to be incapable of going beyond the succeeding TDC, and the engine 1 is just before reversing with the piston 13 in the expansion stroke cylinder 12 located away from TDC. Under these conditions, the distance traveled by the piston 13 in the expansion stroke cylinder 12 is too short and a sufficient torque is not obtained even when a mixture is combusted in the expansion stroke cylinder 12. Therefore, the ECU 2 watts until the rotational direction of the engine 1 once changes from the forward direction to the reverse direction and a mixture produced in the expansion stroke cylinder 12 is compressed and, then, the compressed mixture is combusted in the expansion stroke cylinder 12.

In short, the ECU 2 causes the mixture produced in the expansion stroke cylinder 12 to burn after the mixture is compressed due to the reverse running motion of the engine 1 to give a starting torque to the engine 1 in a reliable fashion.

In the aforementioned sequence, the ECU 2 causes the fuel injector 16 of the expansion stroke cylinder 12 to inject the fuel in step SD25 upon detecting that the rotational direction of the engine 1 has changed from the forward direction to the reverse direction in step SD24. Consequently, the temperature in the expansion stroke cylinder 12 drops due to latent heat absorbed by evaporation of the injected fuel and the pressure in the same cylinder 12 decreases, so that the piston 13 in the expansion stroke cylinder 12 moves to a position closer to TDC due to the reverse running motion of the engine 1 and the distance traveled by the piston 13 in the expansion stroke cylinder 12 increases. This also serves to increase the starting torque produced by combustion in the expansion stroke cylinder 12. Timing of injecting the fuel into the expansion stroke cylinder 12 is not limited to the aforementioned fuel injection timing, but the fuel may be injected into the expansion stroke cylinder 12 before the rotational direction of the engine 1 reverses, although the aforementioned advantageous effect is not obtained in this case.

Further, the ECU 2 causes the fuel injector 16 of the compression stroke cylinder 12 to inject the fuel in step SD27 upon detecting that the rotational direction of the engine 1 has changed from the reverse direction back to the forward direction in step SD26. Since the fuel is injected in about the middle part of the compression stroke in the compression stroke cylinder 12, it is possible to prevent autoignition due to absorption of latent heat by evaporation of the injected fuel. Timing of injecting the fuel into the compression stroke cylinder 12 is not limited to the aforementioned fuel injection timing either, but the fuel may be injected into the compression stroke cylinder 12 before the rotational direction of the engine 1 changes from the reverse direction back to the forward direction, such as at the same time as the fuel is injected into the expansion stroke cylinder 12.

While the ECU 2 causes the spark plug 15 of the expansion stroke cylinder 12 to ignite and combust the mixture produced therein in step SD27 after waiting until the rotational direction of the engine 1 changes from the reverse direction to the forward direction in step SD26 to ensure that the mixture in the expansion stroke cylinder 12 is burnt in a sufficiently compressed state, the invention is not limited to this arrangement. For example, the mixture in the expansion stroke cylinder 12 may be ignited while the engine 1 is rotating in the reverse direction. This makes it possible to restart the engine 1 more quickly.

In the aforementioned operation flows of FIGS. 12 and 13, a sequence of Steps SD2 to SD4 constitutes an engine stopping section 2a for interrupting the fuel supply to the individual cylinders 12A–12D, and step SD7 constitutes a pre-stopping engine state sensing section 2b for judging whether the engine 1 is in a state immediately before stopping wherein the engine speed (TDC engine speed) detected by the first crank angle sensor 30 is lower than the specific value "A" (specific engine speed). Further, steps SD6 and SD12 each constitute a restart conditions checking section 2c for judging whether the specific engine restart conditions have been satisfied, and a sequence of steps SD19 to SD22 constitutes an engine restarting section 2d for injecting the fuel into the expansion stroke cylinder 12 and igniting and combusting a mixture produced therein when the engine restart conditions have been satisfied and for injecting the fuel into the compression stroke cylinder 12 and igniting and combusting a mixture produced therein when the piston 13 in the compression stroke cylinder 12 has gone beyond TDC.

According to the aforementioned operation flows, if the engine restart request is given before the rotational direction of the engine 1 is reversed in the engine stopping period, the mixture produced in one of the compression stroke cylinder 12 or the expansion stroke cylinder 12 is combusted depending on whether the engine speed (TDC engine speed) detected at the moment of the engine restart request is higher than the specific value "A" or not, and when the mixture in the expansion stroke cylinder 12 is to be combusted, ignition timing for the expansion stroke cylinder 12 is varied according to the position of the piston 13 in the expansion stroke cylinder 12, so that the engine 1 can be quickly restarted in a reliable fashion.

Specifically, if the engine restart request is given in the engine stopping period before the engine 1 completely stops after interruption of the fuel supply to the individual cylinders 12A–12D as shown in FIGS. 16A and 16B and the TDC engine speed detected immediately before the moment of the engine restart request is higher than the aforementioned specific value "A", that is, if the rotational inertial force of the engine 1 is so large that the piston 13 in the compression stroke cylinder 12 is not within a range (designated "I" in FIG. 16A) in which the piston 13 can go beyond the succeeding TDC, the fuel is injected into the current compression stroke cylinder 12 and a mixture produced therein is ignited and burnt (steps SD15, SD16). Consequently, the engine 1 can be restarted as shown by a broken line R1 in FIG. 16A.

Figure 17A:
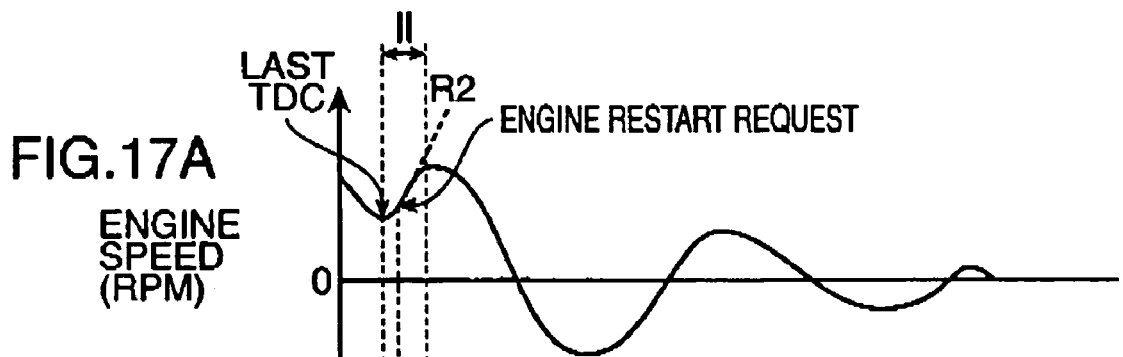
FIGS. 17A–17C are diagrams showing how the engine is restarted in the engine stopping period when the number of reverse running motions of the engine is 0 and the piston in the cylinder on the expansion stroke is within a specific range from TDC in terms of crank angle, FIG. 17A showing the engine speed, FIG. 17B showing the crank angle, and FIG. 17C showing fuel injection and ignition timings for the individual cylinders in relation to the timing of the successive strokes.
Figure 17B:
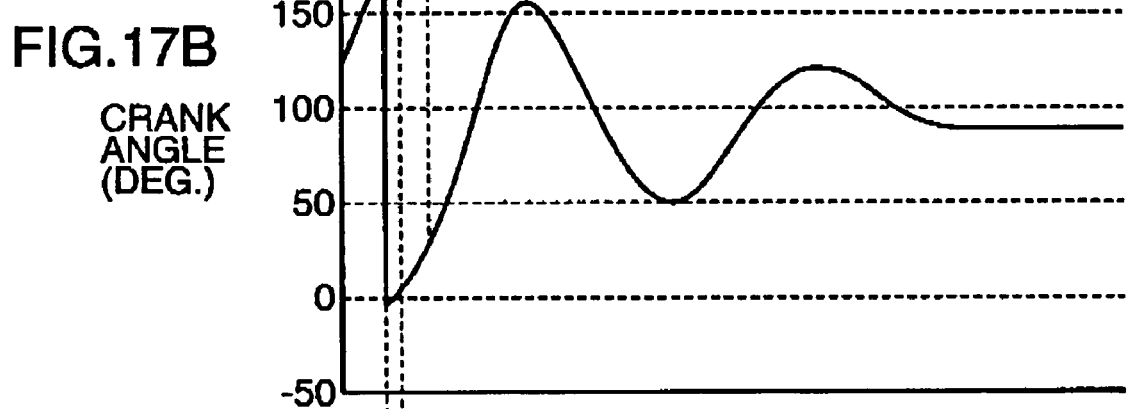

If the engine 1 lastly goes beyond TDC and the TDC engine speed becomes equal to or lower than the aforementioned specific value "A", on the other hand, the rotational inertial force of the engine 1 is now so small that the piston 13 in the compression stroke cylinder 12 can not go beyond the succeeding TDC under current conditions. In this case, if the piston 13 in the cylinder 12 which is currently on the expansion stroke is at a position relatively close to TDC as shown in FIGS. 16B and 17B (e.g., within 0° to 30° ATDC in terms of crank angle as shown in a range designated "II" in FIGS. 16A and 17A), the fuel is immediately injected into the expansion stroke cylinder 12 (second cylinder 12B) at a point shown by the symbol b1 in FIG. 17C (step SD19) and a mixture produced in the same cylinder 12 is ignited and burnt at a point shown by the symbol b2 in FIG. 17C (step SD19) to give an additional torque acting in the forward direction to the forward-running engine 1.

Figure 17C:
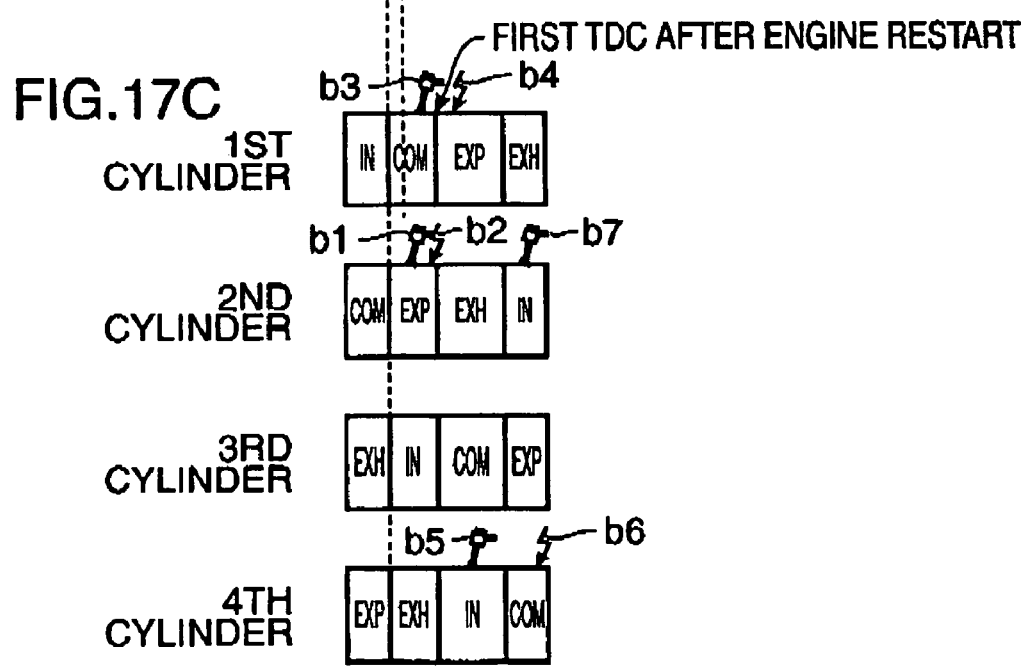

Subsequently, the fuel is also injected into the cylinder 12 (first cylinder 12A) which is on the compression stroke at the moment of the engine restart request at a point shown by the symbol b3 in FIG. 17C (step SD20), so that the temperature in the compression stroke cylinder 12 drops due to latent heat absorbed by evaporation of the injected fuel and the pressure in the same cylinder 12 decreases, making it easier for the piston 13 in the compression stroke cylinder 12 to go beyond TDC. When the cylinder 12 which was initially on the compression stroke has gone into the expansion stroke, a mixture produced in the same cylinder 12 is ignited and burnt at a point shown by the symbol b4 in FIG. 17C (step SD22), whereby the starting torque given to the engine 1 is further increased, making it possible to restart the engine 1 in a reliable fashion as shown by a broken line R2 in FIG. 16A.

Figure 18A:
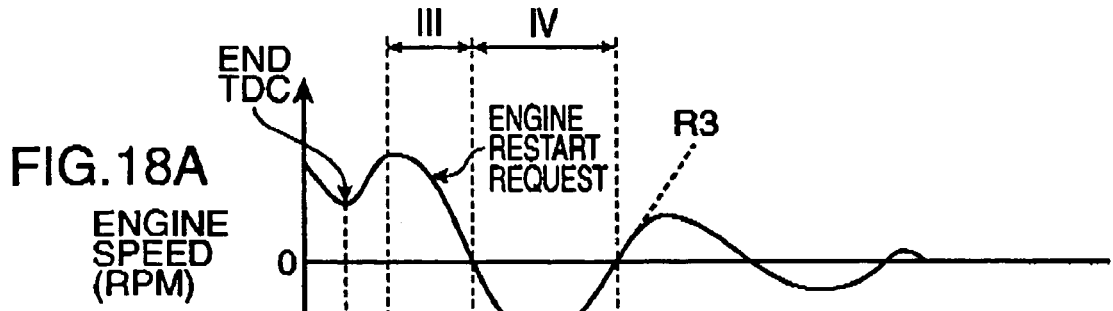
FIGS. 18A–18C are diagrams showing how the engine is restarted in the engine stopping period when the number of reverse running motions of the engine is 0 and the piston in the cylinder on the expansion stroke is outside the specific range from TDC in terms of crank angle, FIG. 18A showing the engine speed, FIG. 18B showing the crank angle, and FIG. 18C showing fuel injection and ignition timings for the individual cylinders in relation to the timing of the successive strokes.
Figure 18B:
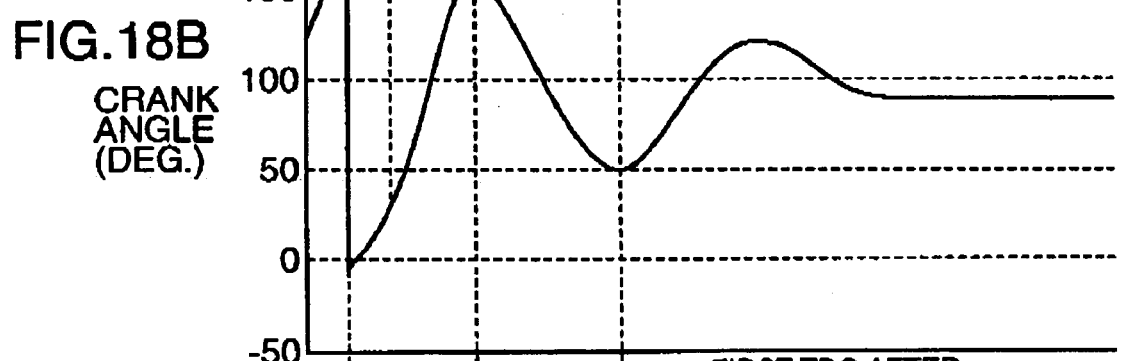
Figure 18C:
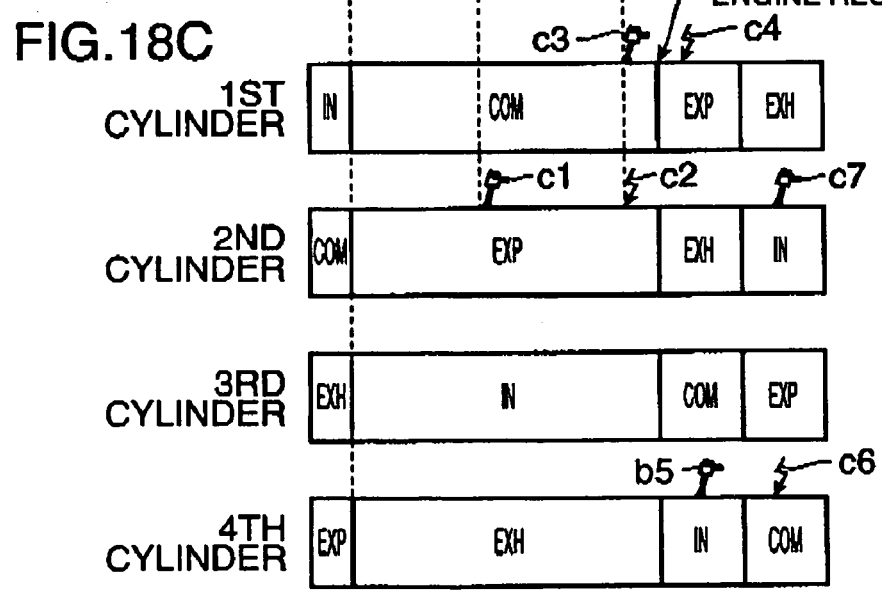

If the piston 13 in the cylinder 12 (second cylinder 12B) which is on the expansion stroke at the moment of the engine restart request is located away from TDC and a sufficient torque is not obtained even when a mixture is combusted in the expansion stroke cylinder 12 under current conditions thereof (within a range designated "III" in FIGS. 16A and 18A), the fuel is injected into the expansion stroke cylinder 12 at a point shown by the symbol c1 in FIG. 18C (step SD25) after the rotational direction of the engine 1 has changed from the forward direction to the reverse direction due to the compressive reaction force exerted by the cylinder 12 (first cylinder 12A) which is on the compression stroke (within a range designated "IV" in FIGS. 16A and 18A). As the engine 1 runs in the reverse direction, the piston 13 in the expansion stroke cylinder 12 moves toward TDC and a mixture produced in the same cylinder 12 is compressed. When the mixture in the expansion stroke cylinder 12 (second cylinder 12B) has been sufficiently compressed and the rotational direction of the engine 1 just changes from the reverse direction back to the forward direction due to the compressive reaction force exerted by the expansion stroke cylinder 12, the mixture in the expansion stroke cylinder 12 is ignited and burnt at a point shown by the symbol c2 in FIG. 18C (step SD27), so that a sufficient starting torque can be given to the engine 1.

Subsequently, the fuel is injected into the cylinder 12 which is on the compression stroke at a point shown by the symbol c3 in FIG. 18C (step SD28) and a mixture produced in the same cylinder 12 is ignited and burnt at a point shown by the symbol c4 in FIG. 18C (step SD22) when the piston 13 in the cylinder 12 which was initially on the compression stroke has gone beyond TDC in the same way as when the piston 13 in the cylinder 12 which is currently on the expansion stroke is close to TDC, whereby the engine 1 can be restarted in a reliable fashion as shown by a broken line R3 in FIG. 16A.

Upon restarting the engine 1 by the aforementioned engine restart control operation, the ECU 2 returns to the normal control operation (step SD23) in which the fuel is injected in the intake stroke (points shown by the symbols b5, b7, c5 and c7 in FIGS. 17C and 18C), the mixture is ignited in a latter part of the compression stroke (points shown by the symbols b6 and c6 in FIGS. 17C and 18C) and the engine 1 returns to normal operation.

It will be appreciated from the foregoing that, when an engine restart request is given before the rotational direction of the engine 1 is reversed in the engine stopping period, it is possible to significantly reduce the time required for engine restart and restart the engine 1 more quickly in response to the engine restart request as shown by the broken lines R1 to R3 in FIG. 16A by performing the aforementioned engine restart control operation in accordance with the engine speed and the position of the piston 13 in the expansion stroke cylinder 12 at the moment of the engine restart request, compared to a case in which the engine 1 is restarted after the engine 1 has completely stopped as shown by a solid line in FIG. 16A.

When the Number of Engine's Reversing Motions Is 1 or More

Figure 14:
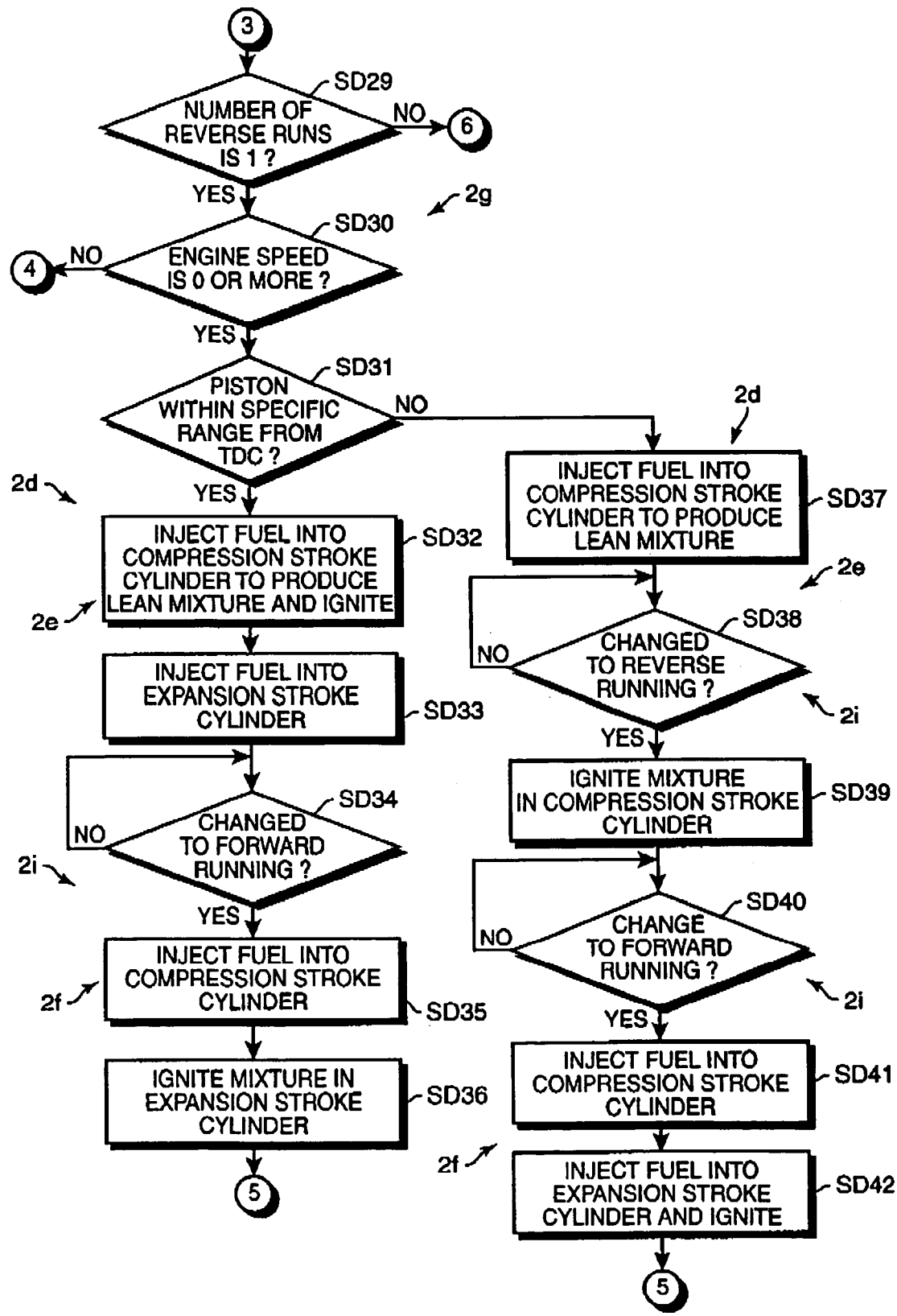
FIG. 14 is a flowchart showing a third part of the engine restart control operation routine performed when the engine restart request is given in the engine stopping period and the number of reverse running motions of the engine is 1.
Figure 15:
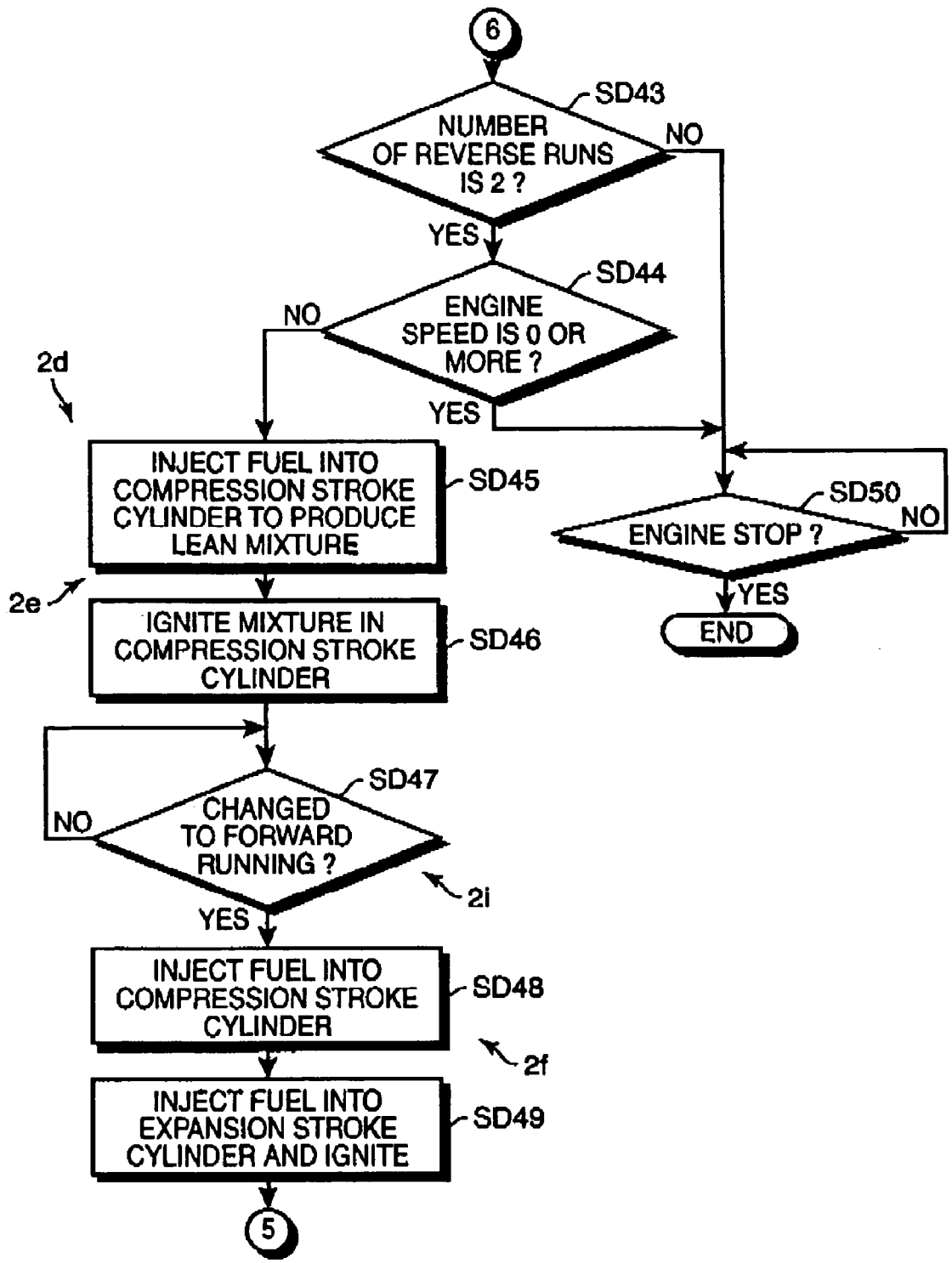
FIG. 15 is a flowchart showing a fourth part of the engine restart control operation routine performed when the engine restart request is given in the engine stopping period and the number of reverse running motions of the engine is 2.

The engine restart control operation performed when the number of reverse running motions of the engine 1 is 1 or more (No in step SD17 of FIG. 13) is now described referring to the flowcharts of FIGS. 14 and 15. When the number of reverse running motions of the engine 1 counted by the reverse run counter is judged to be 1 or more in step SD17 of FIG. 13, the ECU 2 proceeds to step SD29 of FIG. 14, in which the ECU 2 judges whether the counted number of reverse running motions of the engine 1 is 1 or not. If the counted number of reverse running motions of the engine 1 is judged to be 1 (Yes in step SD29), the ECU 2 proceeds to step SD30, in which the ECU 2 judges whether or not the current engine speed is 0 or more (non-negative), that is, whether the current rotational direction of the engine 1 is the forward direction or not. If the counted number of reverse running motions of the engine 1 is judged to be 2 or more (No in step SD29), on the other hand, the ECU 2 proceeds to step SD43 of FIG. 15. In which the ECU 2 judges whether the counted number of reverse running motions of the engine 1 is 2 or not (3 or more).

If the current rotational direction of the engine 1 is judged to be the forward direction (Yes in step SD30), the ECU 2 proceeds to a sequence of steps SD31 to SD42, in which a mixture is combusted in the compression stroke cylinder 12 to give a reversing torque to the engine 1 to move the piston 13 in the expansion stroke cylinder 12 toward TDC so that a mixture in the expansion stroke cylinder 12 is sufficiently compressed and, then, the compressed mixture is combusted in the expansion stroke cylinder 12 to restart the engine 1. If the current rotational direction of the engine 1 is judged to be the reverse direction (No in step SD30), on the other hand, the ECU 2 judges that the engine 1 is halfway in a process of a first reverse running motion and proceeds to a sequence of steps SD25 to SD28 of FIG. 13. In this sequence, a mixture produced in the expansion stroke cylinder 12 is compressed with the aid of the reverse running motion of the engine 1, and after the rotational direction of the engine 1 switches to the forward direction (step SD26), the mixture in the expansion stroke cylinder 12 is combusted to restart the engine 1.

When the counted number of reverse running motions of the engine 1 is 1 and the current rotational direction of the engine 1 is be the reverse direction (No in step SD30), that is, the engine 1 is now rotating in the reverse direction for the first time, the ECU 2 proceeds to the sequence of steps SD25 to SD28 as stated above, in which the mixture produced in the expansion stroke cylinder 12 is compressed by using only the reverse running motion of the engine 1 caused by the compressive reaction force of the compression stroke cylinder 12 and then combusted. Therefore, when a mixture produced in the compression stroke cylinder 12 is first combusted subsequently for producing a starting torque, it is possible to obtain a greater starting torque by burning a larger quantity of fuel at one time compared to a later discussed case in which a mixture is recombusted in the compression stroke cylinder 12 for restarting the engine 1.

Although the aforementioned advantageous effect is not expected to be obtainable, the operation flow of FIG. 14 nay be modified such that the ECU 2 proceeds to step SD31 regardless of the rotational direction of the engine 1 and produces combustion in the compression stroke cylinder 12 to give a reversing torque to the engine 1. This variation of the embodiment makes it possible to restart the engine 1 in a reliable fashion even when the compressive reaction force exerted by the compression stroke cylinder 12 is so small that the mixture in the expansion stroke cylinder 12 can not be sufficiently compressed by the reverse running motion of the engine 1 alone.

Now, the operation flow of step SD31 onward is explained in detail. In step SD31 to which the ECU 2 proceeds when the rotational direction of the engine 1 is judged to be the forward direction (Yes in step SD30), the ECU 2 judges whether the position of the piston 13 in the cylinder 12 which is currently on the expansion stroke is within a specific range from TDC in terms of crank angle, that is, whether the piston 13 in the expansion stroke cylinder 12 is located close to TDC. If the piston 13 in the expansion stroke cylinder 12 is judged to be within this specific range of crank angle (or close to TDC) (Yes in step SD31), the ECU 2 proceeds to step SD32, in which the ECU 2 causes the fuel injector 16 of the cylinder 12 which is currently on the compression stroke to inject the fuel based on the quantity of air introduced into the same cylinder 12, for instance., such that a lean mixture is produced in the compression stroke cylinder 12, and then the ECU 2 fires the spark plug 15 of the same cylinder 12 via the ignition device 27. As a result, the mixture in the compression stroke cylinder 12 is combusted and the rotational direction of the engine 1 changes to the reverse direction, so that the piston 13 in the expansion stroke cylinder 12 moves toward TDC and gas in the expansion stroke cylinder 12 is compressed.

In succeeding step SD33, the ECU 2 causes the fuel injector 16 of the expansion stroke cylinder 12 to inject the fuel and proceeds to step SD34, in which the ECU 2 waits until the rotational direction of the engine 1 changes from the reverse direction back to the forward direction. Then, the ECU 2 proceeds to step SD35, in which the ECU 2 causes the fuel injector 16 of the compression stroke cylinder 12 to reinject the fuel. Proceeding next to step SD36, the ECU 2 fares the spark plug 15 of the expansion stroke cylinder 12 to ignite a mixture produced therein to give a forward-acting torque to the engine 1. Subsequently, the ECU 2 proceeds to step SD21 of FIG. 13 and performs the aforementioned sequence of steps SD21 to SD23, in which the ECU 2 waits until the piston 13 in the compression stroke cylinder 12 goes beyond TDC and causes the spark plug 15 of the same cylinder 12 (now on the expansion stroke) to ignite a mixture produced therein. Consequently, the engine 1 is restarted as it is driven further in the forward running direction. At this point, the ECU 2 completes the engine restart control operation and returns to the normal control operation.

The ECU 2 performs the aforementioned sequence of steps SD32 to SD36 in a case where the engine restart request is given when the counted number of reverse running motions of the engine 1 is 1, the current rotational direction of the engine 1 is the forward direction and the position of the piston 13 in the cylinder 12 which is currently on the expansion stroke is located close to TDC, that is, when the piston 13 in the compression stroke cylinder 12 is located close to BDC immediately after the rotational direction of the engine 1 has changed from the reverse direction back to the forward direction. In this sequence, the mixture produced in the compression stroke cylinder 12 is combusted to change the rotational direction of the engine 1 to the reverse direction, so that the piston 13 in the expansion stroke cylinder 12 moves toward TDC, compressing the mixture produced therein. When the rotational direction of the engine 1 has changed from the reverse direction back to the-forward direction subsequently, the ECU 2 fires the spark plug 15 of the expansion stroke cylinder 12 to ignite the mixture therein.

In short, the rotational direction of the engine 1 is reversed by combustion in the compression stroke cylinder 12 and the mixture produced in the expansion stroke cylinder 12 is sufficiently compressed as a result of the reversing motion of the engine 1. As the mixture thus compressed is combusted in the expansion stroke cylinder 12, it is possible to give a sufficient forward-acting torque to the engine 1 and thereby restart the engine 1 in a reliable fashion.

Furthermore, since the mixture first combusted in the compression stroke cylinder 12 is a lean mixture, it is possible to recombust a mixture in the compression stroke cylinder 12 after the forward-acting torque has been given to the engine 1 by combustion in the expansion stroke cylinder 12, so that the engine 1 can be restarted in a reliable fashion.

If the ECU 2 causes the fuel injector 16 of the expansion stroke cylinder 12 to inject the fuel while the engine 1 is in reversing motion before the rotational direction of the engine 1 changes from the reverse direction to the forward direction, the temperature in the expansion stroke cylinder 12 drops due to latent heat absorbed by evaporation of the injected fuel and the pressure in the same cylinder 12 decreases, so that the piston 13 in the expansion stroke cylinder 12 can be shifted to a position closer to TDC and the distance traveled by the piston 13 in the expansion stroke cylinder 12 can be increased. Timing of injecting the fuel into the expansion stroke cylinder 12 is not limited to the aforementioned fuel injection timing, but the fuel may be injected into the expansion stroke cylinder 12 after the rotational direction of the engine 1 has changed from the reverse direction back to the forward direction.

If the piston 13 in the expansion stroke cylinder 12 is judged to be outside the aforementioned specific range of crank angle of crank angle (located away from TDC) (No in step SD31), on the other hand, the ECU 2 proceeds to step SD37, in which the ECU 2 causes the fuel injector 16 of the cylinder 12 which is currently on the compression stroke to inject the fuel based on the quantity of air introduced into the same cylinder 12, for instance, such that a lean mixture is produced in the compression stroke cylinder 12. Then, the ECU 2 proceeds to step SD38, in which the ECU 2 waits until the rotational direction of the engine 1 changes from the forward direction to the reverse direction. When the rotational direction of the engine 1 has changed from the forward direction to the reverse direction (Yes in step SD38), the ECU 2 proceeds to step SD39, in which the ECU 2 causes the spark plug 15 of the compression stroke cylinder 12 to ignite the mixture produced therein to give an additional reversing torque to the engine 1. In succeeding step SD40, the ECU 2 waits until the rotational direction of the engine 1 changes from the reverse direction back to the forward direction. Then, the ECU 2 proceeds to step SD41, in which the ECU 2 causes the fuel injector 16 of the compression stroke cylinder 12 to reinject the fuel. Proceeding next to step SD42, the ECU 2 also causes the fuel injector 16 of the expansion stroke cylinder 12 to inject the fuel and causes the spark plug 15 of the same cylinder 12 to ignite a mixture produced therein to give a forward-acting torque to the engine 1.

Subsequently, the ECU 2 proceeds to step SD21 of FIG. 13 (as in the case of the aforementioned sequence of steps SD32 to SD36) and performs the aforementioned sequence of steps SD21 to SD23, in which the ECU 2 waits until the piston 13 in the compression stroke cylinder 12 goes beyond TDC and causes the spark plug 15 of the same cylinder 12 (now on the expansion stroke) to ignite a mixture produced therein. Consequently, the engine 1 is driven further in the forward running direction and restarted. At this point, the ECU 2 completes the engine restart control operation and returns to the normal control operation.

The ECU 2 performs the aforementioned sequence of steps SD37 to SD42 in a case where the engine restart request is given when the counted number of reverse running motions of the engine 1 is 1, the current rotational direction of the engine 1 is the forward direction and the position of the piston 13 in the cylinder 12 which is currently on the expansion stroke is located away from TDC, that is, when the piston 13 in the compression stroke cylinder 12 is located close to TDC immediately before the rotational direction of the engine 1 changes from the forward direction to the reverse direction. In this sequence, the mixture produced in the compression stroke cylinder 12 is combusted to give an additional reversing torque to the engine 1 after the rotational direction of the engine 1 has changed to the reverse direction, so that gas in the expansion stroke cylinder 12 is more compressed as a result of the reversing Motion of the engine 1.

Since the mixture produced in the compression stroke cylinder 12 is combusted after the rotational direction of the engine 1 is reversed as stated above, an engine-reversing force produced by combustion in the compression stroke cylinder 12 is added to a compressive reaction force exerted by the compression stroke cylinder 12 in the engine-reversing direction, so that the gas in the expansion stroke cylinder 12 can be more compressed. It is therefore possible to obtain a greater starting torque acting in the forward-running direction from subsequent combustion in the expansion stroke cylinder 12.

Furthermore, since the mixture first combusted in the compression stroke cylinder 12 is a lean mixture, it is possible to recombust a mixture in the compression stroke cylinder 12 after a mixture produced in the expansion stroke cylinder 12 has been combusted as in the aforementioned sequence of steps SD32 to SD36. It is therefore possible to drive the engine 1 further in the forward running direction and restart the engine 1 in a reliable fashion.

While fuel injection into and combustion in the expansion stroke cylinder 12 are made almost at the same time in step SD42 in the aforementioned operation flow of FIG. 14, fuel infection into this cylinder 12 may be made at any convenient point in time.

If the number of reverse running motions of the engine 1 counted by the reverse run counter is judged to be other then 1 (No in step SD29 of FIG. 14). the ECU 2 proceeds to step SD43 of FIG. 15, in which the ECU 2 Judges whether the counted number of reverse running motions of the engine 1 is 2 or not. If the counted number of reverse running motions of the engine 1 is judged to be 2 (Yes in step SD43), the ECU 2 proceeds to step SD44, in which the ECU 2 judges whether or not the current engine speed is 0 or more (non-negative), that is, whether the current rotational direction of the engine 1 is the forward direction or not.

If the current engine speed is negative, that is, the current rotational direction of the engine 1 is the reverse direction (No in step SD44), the ECU 2 proceeds to a sequence of steps SD45 to SD49, in which a mixture produced in the cylinder 12 which is currently on the compression stroke is combusted to give a reversing torque to the engine 1 and, after gas in the cylinder 12 which is currently on the expansion stroke has been compressed as a result of the reversing motion of the engine 1, a mixture produced in the expansion stroke cylinder 12 is combusted to give a forward-acting torque to the engine 1.

If the counted number of reverse running motions of the engine 1 is judged to be other than 2 (No in step SD43) or if the current engine speed is judged to be 0 or more (non-negative), that is, the current rotational direction of the engine 1 is the forward direction (Yes in step SD44), the ECU 2 proceeds to step SD50, in which the ECU 2 judges whether the engine 1 has completely stopped or not. If the judgment result in step SD50 is in the affirmative with the engine 1 judged to have completely stopped, the ECU 2 stores the detected piston stop position in the internal memory and quits the operation flow of FIG. 15. In this case (Yes in step SD50), the ECU 2 transfers to the aforementioned engine restart control operation routine of FIGS. 8 and 9 and begins the engine restart control operation.

In step SD45 to which the ECU 2 proceeds when the current engine speed is judged to be negative, that is, the current rotational direction of the engine 1 is the reverse direction (No in step SD44), the ECU 2 causes the fuel injector 16 of the cylinder 12 which is currently on the compression stroke to inject the fuel such that a lean mixture is produced in the compression stroke cylinder 12. In succeeding step SD46, the ECU 2 causes the spark plug 15 of the compression stroke cylinder 12 to ignite the mixture produced therein to give a reversing torque to the engine 1. After gas in the cylinder 12 which is currently on the expansion stroke has been compressed as a result of the reversing motion of the engine 1, the ECU 2 waits until the rotational direction of the engine 1 changes from the reverse direction back to the forward direction in step SD47. Then, the ECU 2 proceeds to step SD48, in which the ECU 2 causes the fuel injector 16 of the compression stroke cylinder 12 to reinject the fuel. Proceeding next to step SD49, the ECU 2 also causes the fuel injector 16 of the expansion stroke cylinder 12 to inject the fuel and causes the spark plug 15 of the same cylinder 12 to ignite a mixture produced therein to give a forward-acting torque to the engine 1 to restart it. Subsequently, the ECU 2 proceeds to step SD21 of FIG. 13 and performs the aforementioned sequence of steps SD21 to SD23, in which the ECU 2 waits until the piston 13 in the compression stroke cylinder 12 goes beyond TDC and causes the spark plug 15 of the same cylinder 12 (now on the expansion stroke) to ignite a mixture produced therein. Consequently, the engine 1 is restarted as it is driven further in the forward running direction. At this point, the ECU 2 completes the engine restart control operation and returns to the normal control operation.

The ECU 2 performs the aforementioned sequence of steps SD43 to SD49 in a case where the engine restart request is given when the counted number of reverse running motions of the engine 1 is 2 and the current rotational direction of the engine 1 is the reverse direction. In this sequence, the mixture produced in the compression stroke cylinder 12 is combusted to give an additional reversing torque to the engine 1, and after gas in the expansion stroke cylinder 12 has been sufficiently compressed and the rotational direction of the engine 1 has changed from the reverse direction back to the forward direction, a mixture produced in the expansion stroke cylinder 12 is combusted to give a forward-acting torque to the engine 1, whereby the engine 1 can be successfully restarted. Since the mixture first combusted in the compression stroke cylinder 12 is a lean mixture, it is possible to recombust a mixture in the compression stroke cylinder 12 as in the aforementioned sequences of steps SD32 to SD36 and steps SD37 to SD42. It is therefore possible to give a greater starting torque to the engine 1.

When the counted number of reverse running motions of the engine 1 is judged to be larger than 2 or when the current rotational direction of the engine 1 is judged to be the forward direction, the engine 1 will stop in an instant. Thus, the ECU 2 does not perform the engine restart control operation in this condition. The ECU 2 waits until the engine 1 completely stops (step SD50) and then restarts the engine 1 by the engine restart control operation routine shown in FIGS. 8 and 9.

While fuel injection into and combustion in the expansion stroke cylinder 12 are made almost at the same time in step SD49 in the aforementioned operation flow of FIG. 15, fuel injection into this cylinder 12 may be made at any convenient point in time.

In the aforementioned operation flows followed when the number of reverse running motions of the engine 1 counted by the reverse run counter is 1 or more (shown mainly in the flowcharts of FIGS. 14 and 15), the operation flow of FIG. 6, steps SD34. SD38 and SD42 of FIG. 14 and step SD47 of FIG. 15 each constitute an engine rotation direction sensing section 2i for detecting the rotational direction of the engine 1, and the aforementioned sequences of steps SD32 to SD36, steps SD37 to SD42 and steps SD45 to SD49 each constitute an engine restarting section 2d for restarting the engine 1 when an engine restart request is issued in the engine stopping period. It is to be noted that the engine restarting section 2d is used also in the earlier-described sequence of steps SD19 to SD22 performed when the judgment result in step SD17 of FIG. 13 is in the affirmative.

Among the steps constituting the aforementioned engine restarting sections 2d, steps SD32, SD37 and SD39 of the operation flow of FIG. 14 and a sequence of steps SD45 and SD46 of the operation flow of FIG. 15 each constitute an engine reversing section 2e for producing a reversing torque given to the engine 1 by combusting a mixture in the compression stroke cylinder 12. Also, the aforementioned sequences of steps SD33, SD35 and SD36, steps SD41 and SD42, and steps SD48 and SD49 of FIG. 14, and step SD22 of FIG. 13 each constitute an engine forward-rotating section 2f which works as follows. Specifically, after a mixture (gas) in the expansion stroke cylinder 12 is compressed due to a reversing motion of the engine 1 caused by the engine reversing section 2e and the rotational direction of the engine 1 changes from reverse direction to the forward direction, the engine forward-rotating section 2f produces combustion in the expansion stroke cylinder 12 to give a forward-acting torque to the engine 1 and produces further combustion in the cylinder 12 which was initially on the compression stroke and is currently on the expansion stroke.

Further, step SD30 of the operation flow of FIG. 14 constitutes a prohibiting section 2g for prohibiting provision of the reversing torque produced by the engine reversing section 2e to the engine 1 when the counted number of reverse running motions of the engine 1 is 1 and the current rotational direction of the engine 1 is the reverse direction, and steps SD5 and AS13 of the operation flow of FIG. 12 each constitute an intake air quantity regulator controlling section 2h for controlling the throttle valves 23 such that the quantities of air introduced into the individual cylinders 12 increase.

In a case where the engine restart request is given when the counted number of reverse running motions of the engine 1 is 1 or more, the ECU 2 performs the engine restart control operation in an optimum manner according to the number of reverse running motions of the engine 1 and the position of the piston 13 in each cylinder 12 by the aforementioned operation flows of FIGS. 14 and 15. This makes it possible to quickly restart the engine 1 in a reliable fashion.

Specifically, if the counted number of reverse running motions of the engine 1 is 1 (within ranges designated "IV" to "VI" in FIG. 16A) and the current rotational direction of the engine 1 is the reverse direction (within the range designated "IV" in FIG. 16A), the ECU 2 performs the engine restart control operation by the aforementioned sequence of steps SD25 to SD28 in which the mixture produced in the expansion stroke cylinder 12 is compressed by using the reverse running motion of the engine 1 and the compressed mixture in the same cylinder 12 is combusted. Consequently, the engine 1 can be restarted as shown by the broken line R3 in FIG. 16A.

When the rotational direction of the engine 1 has changed from the reverse direction to the forward direction, the mixture produced in the expansion stroke cylinder 12 can not be sufficiently compressed by using only a subsequent reverse running motion of the engine 1 (within a range designated "VII" in FIG. 16A) caused by the compressive reaction force of the compression stroke cylinder 12. Therefore, if the piston 13 in the cylinder 12 which is currently on the expansion stroke is within the aforementioned specific range of crank angle, or close to TDC, as shown in FIG. 19B (within the range designated "V" in FIGS. 16A and 19A) and the mixture produced in the expansion stroke cylinder 12 is not sufficiently compressed yet, the mixture in the compression stroke cylinder 12 is immediately combusted so that the engine 1 rotates in the reverse direction. The mixture in the expansion stroke cylinder 12 is ignited and burnt after the mixture in the same cylinder 12 has been sufficiently compressed as a result of the reverse running motion of the engine 1.

Specifically, if the engine restart request is given when the current rotational direction of the engine 1 is the forward direction and the piston 13 in the cylinder 12 which is Currently on the compression stroke is located away from TDC, the fuel is injected into the compression stroke cylinder 12 at a point shown by the symbol d1 in FIG. 19C (step SD32). and a mixture produced in the same cylinder 12 is ignited and burnt at a point shown by the symbol d2 in FIG. 19C (step SD32) to alter the rotational direction of the engine 1 to the reverse direction, whereby gas in the cylinder 12 (second cylinder 12B) which is on the expansion stroke is compressed. Subsequently, the fuel is injected into the expansion stroke cylinder 12 at a point shown by the symbol d3 in FIG. 19C (step SD33), and as soon as the rotational direction of the engine 1 changes from the reverse direction to the forward direction due to the compressive reaction force exerted by the expansion stroke cylinder 12, a mixture produced in the expansion stroke cylinder 12 is ignited and burnt at a point shown by the symbol d5 in FIG. 19C (step SD36), whereby a forward-acting torque is obtained. As the fuel is injected into the expansion stroke cylinder 12 at the point shown by the symbol d3 (step SD33) before the rotational direction of the engine 1 changes to the forward direction, the distance traveled by the piston 13 in the expansion stroke cylinder 12 is increased as a result of absorption of latent heat by evaporation of the injected fuel, and this makes it possible to increase the torque obtained by combustion in the expansion stroke cylinder 12.

When the rotational direction of the engine 1 has changed to the forward direction, the fuel is reinjected into the compression stroke cylinder 12 at a point shown by the symbol d4 in FIG. 19C (step SD35). Then, after the piston 13 in the compression stroke cylinder 12 has gone beyond TDC, a mixture produced in the same cylinder 12 is ignited and burnt again at a point shown by the symbol d6 in FIG. 19C (step SD22), whereby the engine 1 can be restarted in a reliable fashion as shown by a broken line R4 in FIGS. 16A and 19A.

On the other hand, if the piston 13 in the expansion stroke cylinder 12 is outside the aforementioned specific range of crank angle of crank angle, that is, if the piston 13 in the expansion stroke cylinder 12 is located away from TDC and the piston 13 in the compression stroke cylinder 12 is relatively close to TDC, as shown in FIG. 20B (within the range designated "VI" in FIGS. 16A and 20A), the rotational direction of the engine 1 has not changed to reverse direction due to the compressive reaction force exerted by the compression stroke cylinder 12 yet. Therefore, it is possible to give a larger reversing torque to the engine 1 by combusting a mixture in the compression stroke cylinder 12 and thereby compress gas in the expansion stroke cylinder 12.

Specifically, when the engine restart request is given as shown in FIG. 20A, the fuel is injected into the cylinder 12 (first cylinder 12A) which is on the compression stroke at a point shown by the symbol e1 in FIG. 20C (step SD37). Then, after the rotational direction of the engine 1 has changed from the forward direction to the reverse direction, a mixture produced in the compression stroke cylinder 12 is ignited and burnt at a point shown by the symbol e2 in FIG. 20C (step SD39), whereby a reversing torque is given to the engine 1 to sufficiently compress gas in the expansion stroke cylinder 12 (second cylinder 12B). When the rotational direction of the engine 1 changes back to the forward direction due to the compressive reaction force exerted by the expansion stroke cylinder 12, the fuel is injected into the expansion stroke cylinder 12 at a point shown by the symbol e4 in FIG. 20C (step SD42) and a mixture produced in the same cylinder 12 is ignited and burnt at a point shown by the symbol e5 in FIG. 20C (step SD42). At the same time, the fuel is reinjected into the compression stroke cylinder 12 at a point shown by the symbol e3 in FIG. 20C (step SD41). As the mixture produced in the expansion stroke cylinder 12 is combusted, a forward-acting torque is given to the engine 1. Then, after the piston 13 in the compression stroke cylinder 12 has gone beyond TDC, a mixture produced in the same cylinder 12 is ignited and burnt again at a point shown by the symbol e6 in FIG. 20C (step SD22), whereby the engine 1 can be restarted in a reliable fashion as shown by a broken line R5 in FIGS. 16A and 20A.

Further, if the engine restart request is given when the counted number of reverse running motions of the engine 1 is 2 and the current rotational direction of the engine 1 is the reverse direction (within the range designated "VII" in FIGS. 16A and 21A). the fuel is injected into the cylinder 12 (first cylinder 12A) which is currently on the compression stroke at a point shown by the symbol f1 in FIG. 21C (step SD45) and, then, a mixture produced in the compression stroke cylinder 12 is ignited and burnt at a point-shown by the symbol f2 in FIG. 21C (step SD46), whereby a reversing torque is given to the engine 1 to compress gas in the expansion stroke cylinder 12 (second cylinder 12B). When the rotational direction of the engine 1 changes back to the forward direction due to the compressive reaction force exerted by the expansion stroke cylinder 12, the fuel is injected into the expansion stroke cylinder 12 at a point shown by the symbol f4 in FIG. 21C (step SD49) and a mixture produced in the same cylinder 12 is ignited and burnt at a point shown by the symbol f5 in FIG. 21C (step SD49). At the same time, the fuel is reinjected into the compression stroke cylinder 12 at a point shown by the symbol f3 in FIG. 21C (step SD48). As the mixture produced in the expansion stroke cylinder 12 is combusted, a forward-acting torque is given to the engine 1. Then, after the piston 13 in the compression stroke cylinder 12 has gone beyond TDC, a mixture produced in the same cylinder 12 is ignited and burnt again at a point shown by the symbol f6 in FIG. 21C (step SD22), whereby the engine 1 can be restarted in a reliable fashion as shown by a broken line R6 in FIGS. 16A and 21A.

If the engine restart request is given when the counted number of reverse running motions of the engine 1 is 2 and the current rotational direction of the engine 1 is the forward direction or when the counted number of reverse running motions of the engine 1 is larger than 2 (within a range designated "VIII" in FIG. 16A), on the other hand, the engine 1 will stop in an instant. Thus, the engine 1 is left until it completely stops (step SD50) and then the ECU 2 performs the engine restart control operation routine shown in FIGS. 8 and 9 as shown by the solid line in FIG. 16A.

Upon restarting the engine 1 by the aforementioned engine restart control operation, the ECU 2 returns to the normal control operation (step SD23) in which the fuel is injected in the intake stroke (points shown by the symbols d7, d9, e7, e9, f7 and f9 in FIGS. 19C, 20c and 21C), the mixture is ignited in a latter part of the compression stroke (points shown by the symbols d8, e8 and f8 in FIGS. 19C, 20c and 21C) and the engine 1 returns to normal operation.

It will be appreciated from the foregoing that it is possible to significantly reduce the time required for engine restart and quickly restart the engine 1 in a reliable fashion in response to the engine restart request as shown by the broken lines R4 to R6 in FIG. 16A by performing the aforementioned engine restart control operation in accordance with the current engine speed and piston stop at the moment of the engine restart request given immediately before the rotational direction of the engine 1 is reversed, compared to a case in which the engine 1 is restarted after the engine 1 has completely stopped as shown by the solid line in FIG. 16A.

Moreover, since the mixture can be combusted in the individual cylinders 12 under conditions where the in-cylinder pressure is relatively high by performing the engine restart control operation without waiting for complete engine stop, it is possible to obtain a greater starting torque and thereby restart the engine 1 more quickly in a reliable fashion.

While the invention has thus far been described with reference to the specific embodiment thereof, the invention is not limited thereto but should be construed as including various changes and variations of the embodiment. Although the ECU 2 Judges whether the piston 13 in the compression stroke cylinder 12 can go beyond the succeeding TDC based on the TDC engine speed detected immediately before an engine restart request is given (step SD7) in the foregoing embodiment, the invention is not limited to this arrangement. For example, the ECU 2 may judge whether the piston 13 in the compression stroke cylinder 12 can go beyond the succeeding TDC based on the engine speed detected when the piston 13 is at BDC or at other position.

As thus far described, the engine starting system of the present invention can quickly restart the engine in a reliable fashion in response to an engine restart request given immediately before engine stop at which the rotational direction of the engine is reversed. Therefore, the engine starting system of the invention is useful particularly in a vehicle employing an idle stop system.

In summary, in one principal form of the invention, an engine starting system restarts an engine having multiple cylinders by injecting fuel at least into one of the cylinders which is on an expansion stroke at engine stop and then igniting and combusting a mixture produced in the expansion stroke cylinder. This engine starting system includes an engine stopping section for stopping the engine by interrupting fuel supply to the individual cylinders while the engine is running, a pre-stopping engine state sensing section for detecting that the engine is in a state immediately before stopping wherein engine speed is lower than a specific value, a restart conditions checking section for judging whether specific engine restart conditions have been satisfied, and an engine restarting section for injecting the fuel into the cylinder which is on the expansion stroke and then igniting and combusting the mixture produced therein if the engine is in the state immediately before stopping when the restart conditions checking section has judged that the engine restart conditions have been satisfied in an engine stopping period which begins at a point of fuel supply interruption by the engine stopping section and ends at a point of complete engine stop.

If an engine restart request is given in the engine stopping period, during which the engine speed gradually decreases and eventually becomes zero, after the engine stopping section has interrupted the fuel supply to the individual cylinders, and the engine is in a state immediately before stopping with the engine speed being lower than the aforementioned specific value at the moment of the engine restart request, the engine restarting section injects the fuel into the cylinder which is on the expansion stroke and then ignites and combusts the mixture produced therein in the engine starting system of the invention configured as mentioned above, unlike a conventional engine starting system employing an ordinary combustion control method in which the fuel is supplied in each intake or compression stroke and the mixture is ignited before the top dead center (TDC). Since a forward-acting torque is efficiently given to the engine rotation in a forward direction, it is possible to restart the engine in a reliable fashion.

With this arrangement, it is possible to quickly restart the engine even when the engine restart request is given immediately before engine stop.

Preferably, the aforementioned specific engine speed value is set to a value at which a rotational inertial force of the engine becomes approximately equal to a compressive reaction force exerted by the cylinder which is currently on the compression stroke when a piston in the compression stroke cylinder reaches the proximity of the succeeding TDC. Alternatively, the specific engine speed value may be set to a value at which the rotational inertial force of the engine exceeds the compressive reaction force exerted by the cylinder which is currently on the compression stroke by a specific amount when the piston in the compression stroke cylinder reaches the proximity of the succeeding TDC.

With this arrangement, it is possible to obtain an adequate starting torque and prevent failure in engine restart in a reliable fashion by engine restart control operation performed by the aforementioned engine restarting section not only when the rotational inertial force of the engine so small that the piston in the compression stroke cylinder can not go beyond TDC but also when it is uncertain whether the piston in the compression stroke cylinder can go beyond TDC due to deterioration with the lapse of time or variations in the properties of the engine or due to engine speed detecting accuracy.

In one feature of the invention, it is preferable that the engine restarting section inject the fuel into the cylinder which is on a compression stroke when the engine restart conditions have been satisfied and then ignite and combust a mixture produced in the same cylinder when the cylinder initially on the compression stroke has gone into an expansion stroke with a piston in the cylinder going beyond TDC.

With this arrangement, it is possible to decrease the pressure and thus temperature in the compression stroke cylinder due to absorption of latent heat by evaporation of the fuel as the fuel is injected into the cylinder which is on the compression stroke at the moment of the engine restart request. Consequently, the compressive reaction force exerted by the compression stroke cylinder decreases, making it easier for the piston in the compression stroke cylinder to go beyond TDC. Furthermore, since the mixture produced in the cylinder which was initially on a compression stroke is combusted when the same cylinder has gone into the expansion stroke with the piston in the cylinder going beyond TDC, the starting torque given to the engine is further increased and, thus, the engine can be restarted in a more reliable fashion.

In another principal form of the invention, an engine starting system also restarts an engine having multiple cylinders by injecting fuel at least into one of the cylinders which is on an expansion stroke at engine stop and then igniting and combusting a mixture produced in the expansion stroke cylinder. This engine starting system includes a restart conditions checking section for judging whether specific engine restart conditions have been satisfied, an engine rotation direction sensing section for detecting the rotational direction of the engine when the rotational direction of the engine is reversed due to a compressive reaction force exerted by one of the cylinders which is on a compression stroke immediately before engine reversing and the engine subsequently approaches complete engine stop while repeatedly rotating in forward and reverse directions, an engine stopping section for stopping the engine by interrupting fuel supply to the individual cylinders while the engine is running, and an engine restarting section for restarting the engine when the restart conditions checking section has judged that the engine restart conditions have been satisfied. The engine restarting section includes an engine reversing section for giving a reversing torque to the engine by injecting the fuel into the cylinder which is on the compression stroke and then igniting and combusting a mixture produced therein when the engine restart conditions are satisfied after the engine rotation direction sensing section has judged that the rotational direction of the engine has changed from the forward direction to the reverse direction, and an engine forward-rotating section for giving a forward-acting torque to the engine by injecting the fuel into the cylinder which is on the expansion stroke when the engine restart conditions have been satisfied and then igniting and combusting a mixture produced in the expansion stroke cylinder after the engine rotation direction sensing section has judged that the rotational direction of the engine has changed from the reverse direction to the forward direction.

After the engine stopping section as interrupted the fuel supply to the individual cylinders, the engine speed gradually decreases and the rotational direction of the engine changes from forward direction to the reverse direction due to the compressive reaction force exerted by the cylinder which is on the compression stroke. If the restart conditions checking section judges that the aforementioned engine restart conditions have been satisfied after the engine rotation direction sensing section has judged that the rotational direction of the engine has changed from the reverse direction, the engine reversing section injects the fuel into the cylinder which is on the compression stroke and then ignites and combusts the mixture produced therein so that the reversing torque is given to the engine. Consequently, a piston in the cylinder which is on the expansion stroke moves to the proximity of TDC and, thus, gas in the expansion stroke cylinder is sufficiently compressed.

When the aforementioned engine restart conditions have been satisfied, the engine forward-rotating section injects the fuel into the expansion stroke cylinder. The rotational direction of the engine subsequently changes back to the forward direction due to a compressive reaction force exerted by the expansion stroke cylinder in which the mixture has been compressed as a result of a preceding reversing motion of the engine. When the engine rotation direction sensing section judges that the rotational direction of the engine has changed back to the forward direction, the engine forward-rotating section ignites and combusts the mixture in the expansion stroke cylinder. Since the sufficiently compressed mixture is combusted in the expansion stroke cylinder as mentioned above, it is possible to restart the engine by giving a sufficiently increased forward-acting torque to the engine.

Therefore, it is possible to quickly restart the engine in a reliable fashion without waiting for complete engine stop even when an engine restart request is given immediately before engine stop at which the rotational direction of the engine is reversed.

Moreover, since the mixture in the individual cylinders can be combusted when the in-cylinder pressure is still relatively high by restarting the engine without waiting for complete engine stop as stated above, it is possible to obtain a higher starting torque compared to a case where the engine is restarted after complete engine stop. It is therefore possible to perform engine restart control operation more quickly.

Preferably, the engine starting system further includes a prohibiting section for prohibiting provision of the reversing torque produced by the engine reversing section to the engine when the restart conditions checking section has judged that the engine restart conditions have been satisfied before the engine rotation direction sensing section judges that the rotational direction of the engine once changed to the reverse direction for the first time has changed back to the forward direction.

This is advantageous because, generally, the compressive reaction force exerted by the compression stroke cylinder when the rotational direction of the engine has changed to the reverse direction for the first time is relatively large and, therefore, the mixture produced in the expansion stroke cylinder can be sufficiently compressed by only the first reversing motion of the engine and a sufficient starting torque can be obtained by combustion in only the cylinder which is initially on the expansion stroke. As gas in the expansion stroke cylinder is compressed by only the reversing motion of the engine without combusting the mixture in the compression stroke cylinder when the rotational direction of the engine has first changed to the reverse direction, it is possible to combust the mixture in the compression stroke cylinder when the rotational direction of the engine has changed to the forward direction, so that a greater forward-acting torque can be obtained.

If the engine restart request is given after the rotational direction of the engine once changed to the reverse direction for the first time has changed back to the forward direction, however, the compressive reaction force exerted by each cylinder is so Small that gas in the expansion Stroke cylinder can not be sufficiently compressed by only the reversing motion of the engine caused by the compressive reaction force.

Therefore, when the restart conditions checking section has judged that the engine restart conditions have been satisfied after the rotational direction of the engine has been judged to have changed from the reverse direction to the forward direction for the first time by the engine rotation direction sensing section, it is significantly advantageous to give a reversing torque generated by combustion in the compression stroke to the engine so that gas in the expansion stroke cylinder is sufficiently compressed by the reversing motion of the engine.

In another feature of the invention, it is preferable that the engine reversing section ignites and combusts the mixture produced in the compression stroke cylinder after the rotational direction of the engine has changed from the forward direction to the reverse direction when the restart conditions checking section has judged that the engine restart conditions have been satisfied before the engine rotation direction sensing section judges that the rotational direction of the engine once changed from the reverse direction to the forward direction for the first time has changed to the reverse direction again.

With this arrangement, the mixture produced in the compression stroke cylinder is combusted after the rotational direction of the engine has changed from the forward direction to the reverse direction due to the compressive reaction force exerted by the compression stroke cylinder, so that a greater reversing torque can be given to the engine by using even an extremely small compressive reaction force. Consequently, the mixture produced in the expansion stroke cylinder is more compressed and the torque produced by combustion in the expansion stroke cylinder is further increased.

Preferably, the engine starting system further includes an intake air quantity sensor for detecting the quantity of air introduced into the engine. In this engine starting system, the engine reversing section injects the fuel into the compression stroke cylinder based on the quantity of air detected by the intake air quantity sensor such that a lean mixture is produced in the compression stroke cylinder and then ignites and combusts the mixture produced therein, and the engine forward-rotating section reinjects the fuel into the compression stroke cylinder after first combustion therein and then ignites and combusts a mixture produced in the same after the rotational direction of the engine has changed by combustion in the expansion stroke cylinder and the cylinder which was initially on the compression stroke has gone into the expansion stroke.

In the engine starting system thus configured, the first combustion in the compression stroke cylinder for giving a forward-acting torque to the engine is produced by using the lean mixture produced in the compression stroke cylinder to leave part of air unused therein and this makes it possible to produce second combustion therein. This second combustion in the compression stroke cylinder makes it possible to further increase the forward-acting torque produced by combustion in the expansion stroke cylinder.

Still preferably, the engine starting system further includes an intake air quantity regulator for regulating the quantity of air introduced into the individual cylinders, and an intake air quantity regulator controlling section for controlling the intake air quantity regulator in such a manner that the quantity of air introduced into the individual cylinders increases when the restart conditions checking section has judged that the engine restart conditions have been satisfied.

Since the engine starting system thus configured can increase the quantity of air introduced into the individual cylinders in response to an engine restart request. It is possible to increase torque produced by combustion in the individual cylinders.

This application is based on Japanese patent application serial Nos. 2003-392257 and 2003-432152, filed in Japan Patent Office on Nov. 21, 2003 and Dec. 26, 2003, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An engine starting system for restarting an engine having multiple cylinders by injecting fuel at least into one of the cylinders which is on an expansion stroke at engine stop and then igniting and combusting a mixture produced in said expansion stroke cylinder, said engine starting system comprising:

an engine stopping section for stopping the engine by interrupting fuel supply to the individual cylinders while the engine is running;

a pre-stoppling engine state sensing section for detecting that the engine is in a state immediately before stopping wherein engine speed is lower than a specific value;

a restart conditions checking section for judging whether specific engine restart conditions have been satisfied; and an engine restarting section for injecting the fuel into the cylinder which is on the expansion stroke and then igniting and combusting the mixture produced therein if the engine is in the state immediately before stopping when said restart conditions checking section has judged that the engine restart conditions have been satisfied in an engine stopping period which begins at a point of fuel supply interruption by said engine stopping section and ends at a point of complete engine stop.

2. The engine starting system according to claim 1, wherein said specific engine speed value is set to a value at which a rotational inertial force of the engine becomes approximately equal to a compressive reaction force exerted by the cylinder which is currently on a compression stroke when a piston in said compression stroke cylinder reaches the proximity of succeeding top dead center.

3. The engine starting system according to claim 1, wherein said specific engine speed value is set to a value at which a rotational inertial force of the engine exceeds a compressive reaction force exerted by the cylinder which is currently on a compression stroke by a specific amount when a piston in said compression stroke cylinder reaches the proximity of succeeding top dead center.

4. The engine starting system according to claim 1, wherein said engine restarting section injects the fuel into the cylinder which is on a compression stroke when the engine restart conditions have been satisfied and then ignites and combusts a mixture produced in said cylinder when said cylinder initially on the compression stroke has gone into an expansion stroke with a piston in said cylinder going beyond top dead center.

5. An engine starting system for restarting an engine having multiple cylinders by injecting fuel at least into one of the cylinders which is on an expansion stroke at engine stop and then igniting and combusting a mixture produced in said expansion stroke cylinder, said engine starting system comprising:

a restart conditions checking section for judging whether specific engine restart conditions have been satisfied;

an engine rotation direction sensing section for detecting the rotational direction of the engine when the rotational direction of the engine is reversed due to a compressive reaction force exerted by one of the cylinders which is on a compression stroke immediately before engine reversing and the engine subsequently approaches complete engine stop while repeatedly rotating in forward and reverse directions;

an engine stopping section for stopping the engine by interrupting fuel supply to the individual cylinders while the engine is running; and an engine restarting section for restarting the engine when said restart conditions checking section has judged that the engine restart conditions have been satisfied, said engine restarting section including:

an engine reversing section for giving a reversing torque to the engine by injecting the fuel into the cylinder which is on the compression stroke and then igniting and combusting a mixture produced therein when the engine restart conditions are-satisfied after said engine rotation direction sensing section has judged that the rotational direction of the engine has changed from the forward direction to the reverse direction; and an engine forward-rotating section for giving a forward-acting torque to the engine by injecting the fuel into the cylinder which is on the expansion stroke when the engine restart conditions have been satisfied and then igniting and combusting a mixture produced in said expansion stroke cylinder after said engine rotation direction sensing section has judged that the rotational direction of the engine has changed from the reverse direction to the forward direction.

6. The engine starting system according to claim 5 further comprising a prohibiting section for prohibiting provision of the reversing torque produced by said engine reversing section to the engine when said restart conditions checking section has judged that the engine restart conditions have been satisfied before said engine rotation direction sensing section judges that the rotational direction of the engine once changed to the reverse direction for the first time has changed back to the forward direction.

7. The engine starting system according to claim 6, wherein said engine reversing section ignites and combusts the mixture produced in said compression stroke cylinder after the rotational direction of the engine has changed from the forward direction to the reverse direction when said restart conditions checking section has judged that the engine restart conditions have been satisfied before said engine rotation direction sensing section judges that the rotational direction of the engine once changed from the reverse direction to the forward direction for the first time has changed to the reverse direction again.

8. The engine starting system according to claim 5 further comprising:

an intake air quantity sensor for detecting the quantity of air introduced into the engine;

wherein said engine reversing section injects the fuel into said compression stroke cylinder based on the quantity of air detected by said intake air quantity sensor such that a lean mixture is produced in said compression stroke cylinder and then ignites and combusts the mixture produced therein; and wherein said engine forward-rotating section reinjects the fuel into said compression stroke cylinder after first combustion therein and then ignites and combusts a mixture produced in said compression stroke cylinder after the rotational direction of the engine has changed by combustion in said expansion stroke cylinder and said cylinder which was initially on the compression stroke has gone into the expansion stroke.

9. The engine starting system according to claim 5 further comprising:

an intake air quantity regulator for regulating the quantity of air introduced into the individual cylinders; and an intake air quantity regulator controlling section for controlling said intake air quantity regulator in such a manner that the quantity of air introduced into the individual cylinders increases when said restart conditions checking section has judged that the engine restart conditions have been satisfied.

* * * * *